(12) United States Patent
Wilson, Jr. et al.

(10) Patent No.: US 9,062,451 B1
(45) Date of Patent: Jun. 23, 2015

(54) PRE-CONSTRUCTED BUILDING UNIT CONSTRUCTION AND TRANSPORTATION STRUCTURE AND METHOD

(75) Inventors: Jerry Frank Wilson, Jr., Birmingham, AL (US); George Todd Honeycutt, Harvest, AL (US)

(73) Assignee: Pride Falls, LLC, Birmingham, AL (US)

( * ) Notice: Subject to any disclaimer, the term of this patent is extended or adjusted under 35 U.S.C. 154(b) by 2409 days.

(21) Appl. No.: 11/469,389

(22) Filed: Aug. 31, 2006

Related U.S. Application Data

(60) Provisional application No. 60/821,526, filed on Aug. 4, 2006.

(51) Int. Cl.
   *E04B 1/343* (2006.01)
   *E04B 5/00* (2006.01)
   *E04B 7/00* (2006.01)

(52) U.S. Cl.
   CPC .............. *E04B 1/34336* (2013.01); *E04B 5/00* (2013.01); *E04B 7/00* (2013.01)

(58) Field of Classification Search
   CPC . E04B 1/343; E04B 1/34315; E04B 1/34321; E04B 1/34336; E04B 1/348; E04B 1/34807; E04B 2/56; E04B 2/70; E04B 2/707; E04B 2002/7472; E04B 5/00; E04B 7/00
   USPC .............. 52/79.2, 79.12, 459, 478, 518, 520, 52/543, 481.1, 506.1, 506.03, 506.09, 764, 52/781, 417, 281, 690, 521, 540, 591.4, 52/519, 79.1
   See application file for complete search history.

(56) References Cited

U.S. PATENT DOCUMENTS

| | | | | |
|---|---|---|---|---|
| 1,913,066 A | * | 6/1933 | Carter | 52/270 |
| 2,332,059 A | * | 10/1943 | Cheshier | 52/643 |
| 2,401,589 A | * | 6/1946 | Smith | 52/11 |
| 2,578,085 A | * | 12/1951 | Perkins | 52/464 |
| 3,082,489 A | * | 3/1963 | Douglas | 52/262 |
| 3,378,966 A | * | 4/1968 | Lindal | 52/90.1 |
| 3,505,767 A | * | 4/1970 | Fyle, Jr. | 52/143 |
| 3,716,267 A | | 2/1973 | Lindsay | |
| 3,795,336 A | | 3/1974 | Acker | |
| 3,796,440 A | | 3/1974 | Shave | |
| 3,811,722 A | | 5/1974 | Jones | |
| 3,834,111 A | | 9/1974 | Acker | |

(Continued)

FOREIGN PATENT DOCUMENTS

| | | |
|---|---|---|
| DE | 2052614 | 10/1969 |
| GB | 1305097 | 1/1973 |

OTHER PUBLICATIONS http://web.archive.org/web/20050615162530/paa.asn.au/tech_info.asp?view=application.*

(Continued)

*Primary Examiner* — Joshua J Michener
*Assistant Examiner* — Theodore Adamos
(74) *Attorney, Agent, or Firm* — Jeremy A. Smith; Nathan W. Johnson; Bradley Arant Boult Cummings LLP

(57) ABSTRACT

A transportable building unit, and a method for constructing the same, which has sufficient strength to resist bending and other forces that otherwise may cause damage during transport, as well as a transportation system and method for transportable building units.

19 Claims, 21 Drawing Sheets

(56) References Cited

U.S. PATENT DOCUMENTS

| | | | |
|---|---|---|---|
| 3,944,242 A | | 3/1976 | Eubank |
| 4,275,533 A | * | 6/1981 | Wright .......................... 52/79.1 |
| 4,930,809 A | | 6/1990 | Lindsay |
| 5,826,389 A | * | 10/1998 | Siler ............................ 52/309.1 |
| 6,006,480 A | * | 12/1999 | Rook .......................... 52/309.12 |
| 6,067,771 A | * | 5/2000 | Blankenship ................ 52/745.2 |
| 6,467,223 B1 | | 10/2002 | Christley |
| 6,494,013 B2 | * | 12/2002 | Winskye .................... 52/745.01 |
| 6,681,535 B1 | | 1/2004 | Batchelor |
| 7,331,149 B2 | * | 2/2008 | Tollenaar .................... 52/481.1 |
| 7,520,100 B1 | * | 4/2009 | Herrman et al. ............. 52/481.1 |

OTHER PUBLICATIONS http://web.archive.org/web/20050616004151/paa.asn.au/pdf/Plywood_Wall_Bracing_NEW_20.pdf.*
Safeway Homes, LLC; "10 Reasons to Choose the Safeway Home"; Brochure; date not known.

* cited by examiner

Pin-Pin Conditions

Cantilever End Conditions

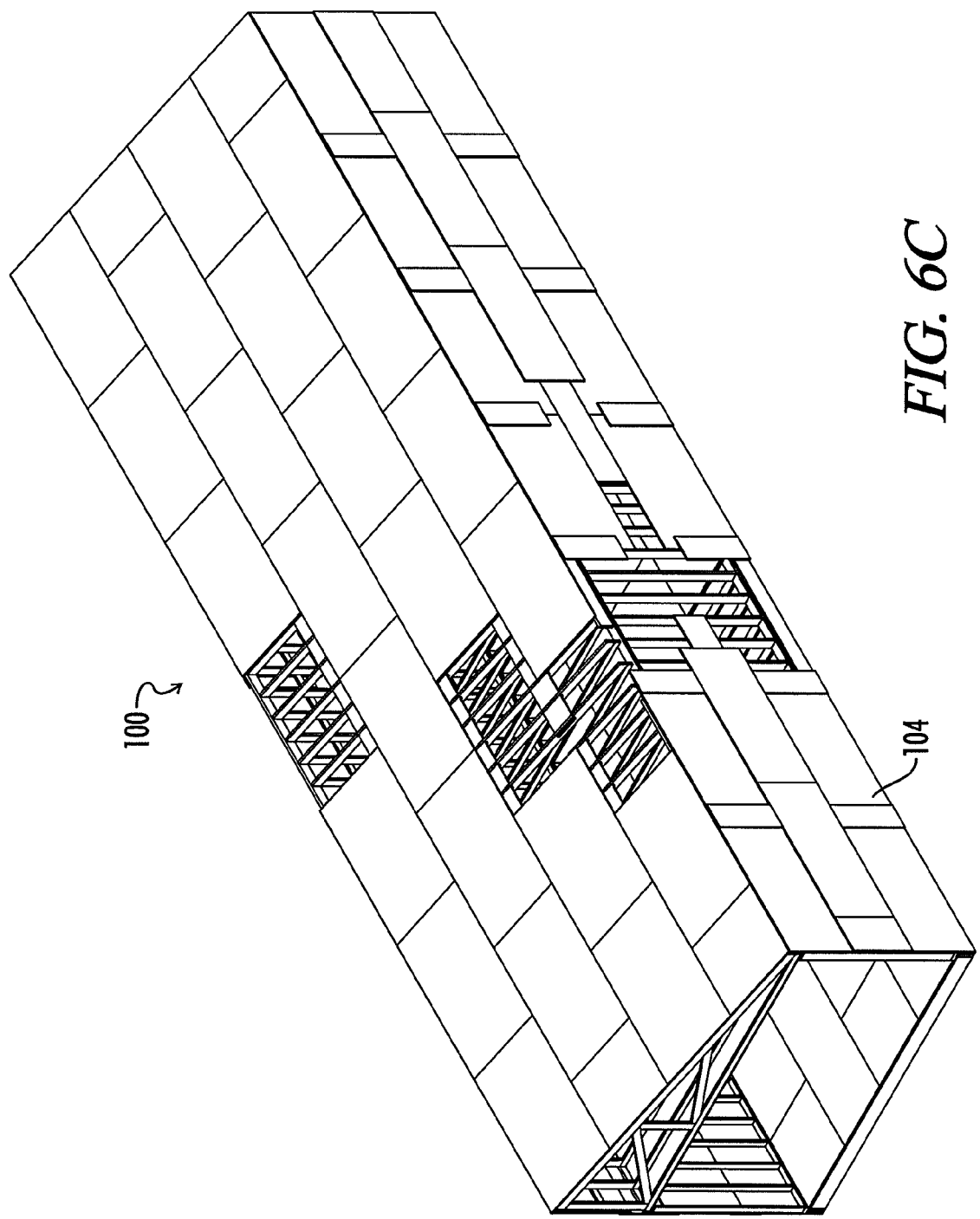

FIG. 10B    FIG. 10C

PRE-CONSTRUCTED BUILDING UNIT CONSTRUCTION AND TRANSPORTATION STRUCTURE AND METHOD

This application claims the benefit of and priority to U.S. Provisional Application No. 60/821,526 filed Aug. 4, 2006.

BACKGROUND OF THE INVENTION

1. Field of the Invention

The invention relates to factory-built housing (and possibly other factory built buildings) and may have application to other areas including without limitation modular and other pre-constructed housing and other pre-constructed buildings, and includes methods for construction and transportation of the same.

2. Description of Related Art

Transportable building construction is subject to difficulties in obtaining sufficient longitudinal dimension, while at the same time exhibiting appropriate stiffness resisting primary bending, quality of ride in transport, and overall business economy. Prior technology has attempted numerous different approaches undertaken in the quest to construct an economic transportable building unit and its associated transport system, but none to the satisfaction of the inventors.

Current transportable buildings can be generally categorized into several types: manufactured homes (which are regulated by federal law), frame-on modular homes, frame-off modular homes and other modular buildings. Each of these three types of transportable building construction as a general rule primarily use the same art of steel frame and wheel sub-assembly construction. FIG. 1 provides a side view of a typical steel frame and wheel sub-assembly 50. Typical approaches taken in prior practice have attached wheels for transportation purposes in one of the following scenarios: locating the floor above the axles, embedding the wheels into recesses of the floor or support structure, or using a dolly trailer to carry the building unit. Each of these solutions represents a trade off in terms of cost of equipment versus ride quality (wherein poor ride quality risks cosmetic or structural damage during or prior to delivery). These solutions have focused on transporting the structure using an external support (even if integrated into the building as an under-frame) to provide the basic structural features needed to support the building over the wheels and to span the distance between the wheels. Because that external support is conceived as a single-use (or few-use) transportation support, it is given little consideration as being a value-added structural system for general integrity of the building purposes.

In each of these cases, due to the fact that the building may have to pass under bridges and other obstacles, the building-plus-carriage must remain below maximum road height requirements. The Department of Transportation typically limits oversized loads to a height of around 15 feet (457 cm), but this figure varies depending on factors such as the states being traveled and the routes taken. The limit that constrains the height of transportable buildings is derived by subtracting the carriage height from the legal road limit height. The steel frame and wheel assembly 50 used by the vast majority of transportable buildings carries the bottom of the floor joists at a height of approximately 36 inches (91 cm) above the ground, leaving only 12 feet (366 cm) for the remainder of the living quarters and the roof. This height constraint proves to be an important factor in the design of transportable buildings and the associated transport system. One implication of this height limit is that many transportable buildings have relatively low pitch roofs or hinged roofs, which may be undesirable for any number of reasons. Likewise, to maximize the height available for the building structure, transportation carriages for transportable buildings frequently use the smallest diameter wheels 51 possible, the lowest profile spring suspension (not shown), and the lowest profile (least tall) I-beams 52 for the frame, each of which may result in a frame and wheel suspension system 50 that does not provide a high quality ride during transport. The result is that a building, constructed in accordance with conventional practice, when transported may be subjected to an undesired level of shock and vibration, risking any number of types of damage, such as crushed and buckled floor panels, cracked sheet rock and torn sheet rock joints, detachment of cabinets, fixtures and trim work.

An additional issue posed by reduction of transport profile is that obstacles such as railroad tracks and uneven ground may cause jolting or impassable areas. Some low boy trailers can elevate the front end of the assembly up to several feet. However, the rear suspension unit on low boy trailers typically has a very limited lifting ability. Those equipped with air ride suspension can typically lift the load approximately eight (8) inches (20 cm), but this may be insufficient when encountering larger obstacles or road variance.

The steel frame and wheel sub-assemblies 50 can sometimes be reused in the case of frame-off modular construction. In some cases manufacturers will transport the frame/wheel subassembly 50 back to the factory for re-use. As a general rule, the sub-assembly 50 will only be usable for two or three additional trips due to DOT safety requirements and structural integrity issues that arise out of wear and tear. In addition, transport cost back to the factory from the consumer's home site incurs additional cost because the subassembly requires special "wide load" permits that also require escort cars.

Some solutions have sought to strengthen the floor structure of the building in attempts to replace the steel frame 50. These activities focus on strengthening the floor, or the material below the floor, rather than conceiving of the structure of the building as a whole. As a result of this focus on the floor or below-flooring area as being the primary or sole location of structural integrity for lifting and spanning purposes, current transportation designs that lift the building make no attempt to provide the building unit with anything other than a "simple support" or "pin" end condition. These transportation systems may not provide adequate resistance to rotation of the ends of the buildings about the horizontal lateral axis (i.e., an axis drawn side-to-side across the width of the building unit, perpendicular to a straight line of travel). Thus the ends of the buildings tend to rotate about the horizontal lateral axis as the unit is lifted and the unit "sags" in the middle. FIG. 2A shows a side view of an idealized simply-supported beam 60 that may conceptually be considered to represent a building where the floors at the ends are sloped toward the middle. The support on the right can move horizontally and is frictionless so that deflection cannot cause tensile stresses within the beam 60 (mimicking the condition in a building during transport where it is supported only by forward and rearward wheels). The beam 60 is shown deflecting under a uniform distributed loading. The figure provides a level reference line 61 to help show the slope of the beam 60 or floor surface at the ends. The slope of beam surface is greatest at the ends directly above the pin supports. FIG. 2B shows an idealized beam 62 supported and constrained at the ends in a cantilever end condition. The support on the right can move horizontally and is frictionless so that deflection cannot cause tensile stresses within the beam 62. The beam 62 is shown deflecting under a uniform distributed loading. A straight, level line 61 has been added to help highlight how the ends of the beam 62 are constrained so they do not rotate as the beam 62 deflects under loading. These figures help show that the ultimate result of not providing a constraint to resist rotation about the horizontal lateral axis is that the buildings are subjected to higher stresses and suffer damage during transport as a result of excessive bending along the length of the unit.

Many conventional manufactured and modular houses require shear walls at selected locations near the middle of the floor plans, to support the exterior and marriage walls and to counter lateral wind forces. They also provide the ceiling and roof truss structure with resistance to uplift and downward forces caused by winds. The requirement for shear walls limits configuration flexibility, such as relocation of or removal of walls.

Manufactured homes and "frame on modular" houses typically have difficulty qualifying for the advantageous financing that is available to site-built homes. Also, these houses tend to suffer from appraisals that assign them at a relatively low value as they are typically treated as depreciating personal property.

Whatever the limitations of transportable buildings, there are undeniable advantages to a building that can be built in a mass production factory environment. These include construction time gauged in hours, rather than months, time-value of money and elimination or reduction of "construction loans" for the consumer, lower costs of construction, economies of scale in purchasing, reduced scrap loss and over-inventory (due to inventory for multiple productions being centralized), reduced exposure and weather damage to materials, use of jigs and fixtures that facilitate assembly of the floor, walls, ceiling, and roof structures, and thereby increase the squareness and uniformity of construction-to-plan, and institutionalized quality control and inspection systems or services in a factory environment.

Use of conventional techniques to join building materials results in transportable buildings not being as strong or as stiff as they could potentially be. In prior practice, wood sheet goods (like plywood and oriented strand board, commonly called OSB) typically are installed with an edge gap of approximately $\frac{1}{8}^{th}$ inch (3.2 mm) at all four edges. However, in practice, this contributes to the sheet goods each acting to some degree independently, as slippage and movement is allowed between the panels. The intentional provision for such slippage and independent movement ignores the potential value that unifying the panels may have for the overall structure's stiffness.

In keeping with the assumption in prior practice that not only is some measure of independence and movement of components relative to one another acceptable, but is desirable, other joints in the structures typically have been connected in a way that similarly allows for modest amounts of movement among individual components. In site-built housing, where the building is expected to be held in a static condition by its stationary emplacement, this may be acceptable. However, transportable buildings are subjected to additional stresses when they are lifted, hoisted, transported, and otherwise generally subjected to stresses of movement, torsion, bending and shifting. In such conditions, the modest slippage between individual components must be viewed in the aggregate across the structure as a whole. When so viewed with respect to a building spanning a distance greater than 30 feet (914 cm), the aggregate slippage becomes meaningful and translates into substantial slack in the structure. Typical construction in the past of even transportable buildings has relied heavily on fasteners such as nails, staples or screws as the materials to connect the pieces of lumber or sheets of ply material to each other. While these joints do connect the adjoining structural pieces, the joints are insufficiently effective at truly unifying these to act as a single structure. There is therefore, in conventional construction, typically a meaningful amount of slippage between adjoining members, and as a result, structures constructed in this art suffer a large amount of deflection before "the slack is taken out" of these joints.

For example, in the case where plywood sheathing 114 is being fastened to a vertical wall stud 111, the total contact area for a joint secured using adhesive will be 1.5 inches (3.8 cm)×the wall height (say 8 feet=96 inches (244 cm)) equals 144 square inches (929 cm$^2$). In the case where nails are used, assuming that 16 penny nails are used and that nails are spaced 6 inches (15.2 cm) apart, approximately 16 nails will be used. The diameter of a 16 penny bright common nail is approximately 0.162 inches (4.11 mm) and the thickness of plywood sheathing 114 is no greater than 0.72 inches (18.3 mm), so the total bearing surface area of the nail in the plywood 114 is 16*0.162*0.72=1.87 square inches (12.1 cm$^2$). Thus the adhesive joint spreads the applied force over an area approximately 77 times greater than the nail joint delivers. Furthermore, as shear loading is applied to these nails, they will tend to bend in the direction of the applied force, and the effective bearing surface area of the nails will tend to decrease. Moreover, because of the point-contacts created by a nail, screw, staple, or similar fastener, when such fasteners alone are used, when sheathing 114 is subjected to a rotation relative to the substrate (e.g., the studs 111), the panel 114 has some freedom to pivot about the point contact.

Where only slippage-permitting joints are used, rather than a near-zero slip joint, each type of stress—tension, rotation, compression and shear—may allow for meaningful movement across the aggregate of joints before effective transfer of force among structural members.

Consider the joint where the wall bottom plates 121 are fastened to the floor decking 109. In joints constructed using conventional fasteners alone, a loading that results in these members 109, 121 bending will be countered by the sum of resistance provided by these two structures 109, 121 acting independently, not acting in concert. FIG. 2C shows an idealized side view of a composite beam 63 made of four independent beam elements 64 protruding from a wall. FIG. 2D shows how these structures 64 behave and deflect when operating independently. FIG. 2E shows how these structures 64 behave and deflect when unified as one structure 63 and operate together. In order to more clearly demonstrate the concepts, the beams 63, 64 shown in FIGS. 2D and 2E are deflected a certain amount. While the amount of this deflection appears to be equal, no information is given about the loading that would cause such deflection. It is generally true that the unified beam 63 shown in FIG. 2E would require significantly more force to deflect the beam 63 an amount equal to that seen in FIG. 2D. This theoretical example assumes that the beam elements 64 are fabricated to be substantially the same except for the difference of the beam 63 shown in FIG. 2E being unified to act as a united structure. Structures that act independently will neither be as strong nor as stiff as structures that are combined to act as a single unit.

It is now known to the inventors that structures joined by spreading the applied force out over a larger area will tend to form a joint with less slippage than alternate approaches that concentrate the applied forces into smaller areas. Joints formed by spreading the applied force out over a larger area are also very likely to result in joints that are stronger in many respects.

FIG. 3 depicts an idealized graph that contrasts the dashed line 70 depicting the stress-strain (or load-deflection) behavior exhibited by structural elements joined using the conventional art fasteners (such as nails, staples and screws) with the solid line 71 depicting the behavior exhibited by structural elements joined with near-zero slip joints. The leftmost portion 72 of the dashed line 70 depicting current art's stress-strain behavior shows line 70's slope transitioning from being almost flat and increasing to being almost as steep as solid line 71. This area 72 where line 70's slope is less steep than it is on the rightmost portion of the graph indicate a relatively large amount of slippage before "the slack is taken out" and the structure begins to deliver a significant amount of strength and stiffness. The flexibility and post-transport damage exhibited by transportable buildings constructed using conventional practice serve as evidence of this. The upper solid line 71 depicts how a unified structure exhibits no appreciable slippage between components as loading is applied. We use the term "near zero-slip joints" when referencing such joints in which the stiffness of the bonded joint is greater than the stiffness of either of the parent materials being joined. Near zero-slip joints can be formed by substantially or completely covering the surfaces to be joined with a suitable adhesive, the structures to be place are put into place, and the structures are held until the adhesive is cured. Alternatively where the materials are suited for this, mechanical fasteners may be used to hold the assembled joints together while the adhesive sets.

Aggregate slippage is particularly relevant in a structure that will travel roadways because the expected maximum deflection at mid-span must be added to the desired clearance height of the floor during shipment to determine the height at which the floor end supports must be carried. Knowing this height together with the maximum DOT road height limit will allow the designer to select the height of the building unit ends thus determining the roof truss height, which designers may seek to maximize.

OBJECTS OF THE INVENTION

It is an object of the invention to enhance the state of the art in preconstructed and partially preconstructed buildings or the transport thereof. In the course of this disclosure, the inventors may refer to certain advantages or capabilities, but it should be understood that such advantages and capabilities are alternative and exemplary only, and no one or any should be read as required for the practice of the invention, or as an exhaustive listing of potential advantages or capabilities that may apply.

BRIEF SUMMARY OF THE INVENTION

The invention teaches a method of construction, a structure, and a transportation system for constructing transportable building units.

BRIEF DESCRIPTION OF THE DRAWINGS

Not all parts are shown in these figures. Parts have been omitted and some images provided in cut-away or see-through views to facilitate discussion. Parts may not be drawn to scale, and all figures should be understood to be examples, rather than the exclusive manner of practice of the invention.

FIG. 5D depicts a shown embodiment of the lifting system, and FIG. 5E depicts one of any number of alternative embodiments of the lifting frame and elevation system.

FIGS. 6A, 6B, 6C and 6D each show an isometric view of an embodiment of integrated building unit structure 100 with some materials removed to provide clarity and greater detail. FIG. 6A shows the overall marriage wall 103 view. FIG. 6B provides a closer view and additional detail of FIG. 6A. FIG. 6C shows the overall exterior wall 104 view. FIG. 6D provides a closer view and additional details of FIG. 6C.

FIGS. 10B and 10C show isometric views of two of any number of alternative embodiments for the slide 172, guide 173, and lift actuator 171 of the elevation system 170. Not all parts are shown.

DETAILED DESCRIPTION

Figure 1:
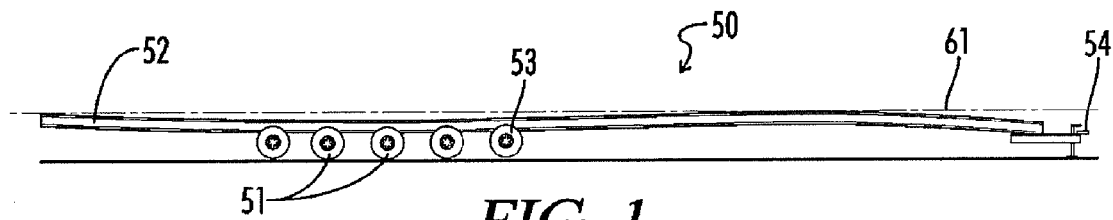
FIG. 1 shows a side view of the steel frame and wheel carriage assembly 50 typically used in conventional practice to support manufactured houses and modular houses shipped prior to 2006. A straight, level line 61 has been added to help highlight the curve or camber typically present in the I-beams 51 prior to being attached to the manufactured houses and modular houses.

The following detailed description is provided to teach the principles of the invention and contains detail that may relate to preferences of the inventors, but is not intended to limit the invention in any way.

Understanding of the disclosure herein will be facilitated by reference to beam or bridge design principles, which are not known to the inventors to be commonly applied in the field of building transportable structures. An equation useful to calculate mid-span deflection of such structures is:

$$\text{Mid-span Deflection} = (5*w*L^4)/(384*E*I)$$

Where:
All values are expressed using the same system of units (like pounds and feet)
w=the loading per unit length (like pounds per foot)
L=overall length of the unit between the supports (feet)
E=modulus of elasticity of the material (pounds per square foot)
I=section moment of inertia (feet^4)

The challenge of carrying a building unit 100 some sixty (60) feet (18.3 m) in length from suspension points in the front and rear is difficult because many characteristics are influenced by factors other than engineering design considerations. The building unit's length is fixed, the weight is substantially fixed, and the modulus of elasticity is largely driven by economic incentives to use wood to the greatest degree possible. While the use of other materials such as non-metallic synthetics, light gauge steel, aluminum, or combinations thereof is an option, the need to maintain production economy drives the designer to use materials and parts that are easily used in a production line that also produces building units of the conventional art. Thus wood (primarily pine) at the time of this application is the most economical material, and the modulus of elasticity along the grain is generally accepted to be approximately 1,600,000 pounds per square inch (11 GPa). It should be understood that a building unit 100 can be constructed, in accordance with the teaching of this disclosure, that uses only wood for its structural members (excluding consideration of fasteners, adhesives and the like). The significant parameter, then, that is readily controlled by the designer is the moment of inertia. Moment of inertia is a mathematical expression indicating or quantifying a structure's stiffness or resistance to bending when subjected to a transverse loading. The inventors believe (without wishing to be limited to theory) that stiffness, not merely strength, is the more pressing requirement for building units that are to be transported and emplaced in the manner described. Generally speaking, any structure spanning such a distance is required to be considerably stiffer in primary (vertical) bending than is found in buildings constructed using the conventional techniques.

An equation used to calculate moment of inertia for a composite section, such as that presented by the cross section of a building module, is as follows:

$$I = \text{the summation of } (b*h^3/12 + A*d^2) \text{ for each of the separate sections being combined into the composite structure}$$

Where:
All values are expressed in the same system of units (like pounds and feet)
I=the composite section Moment of Inertia
b=width of the member
h=height of the member
A=cross sectional area of the member (b*h)
d=distance from each section's vertical centroid to the composite section's neutral axis 90

Figure 4:
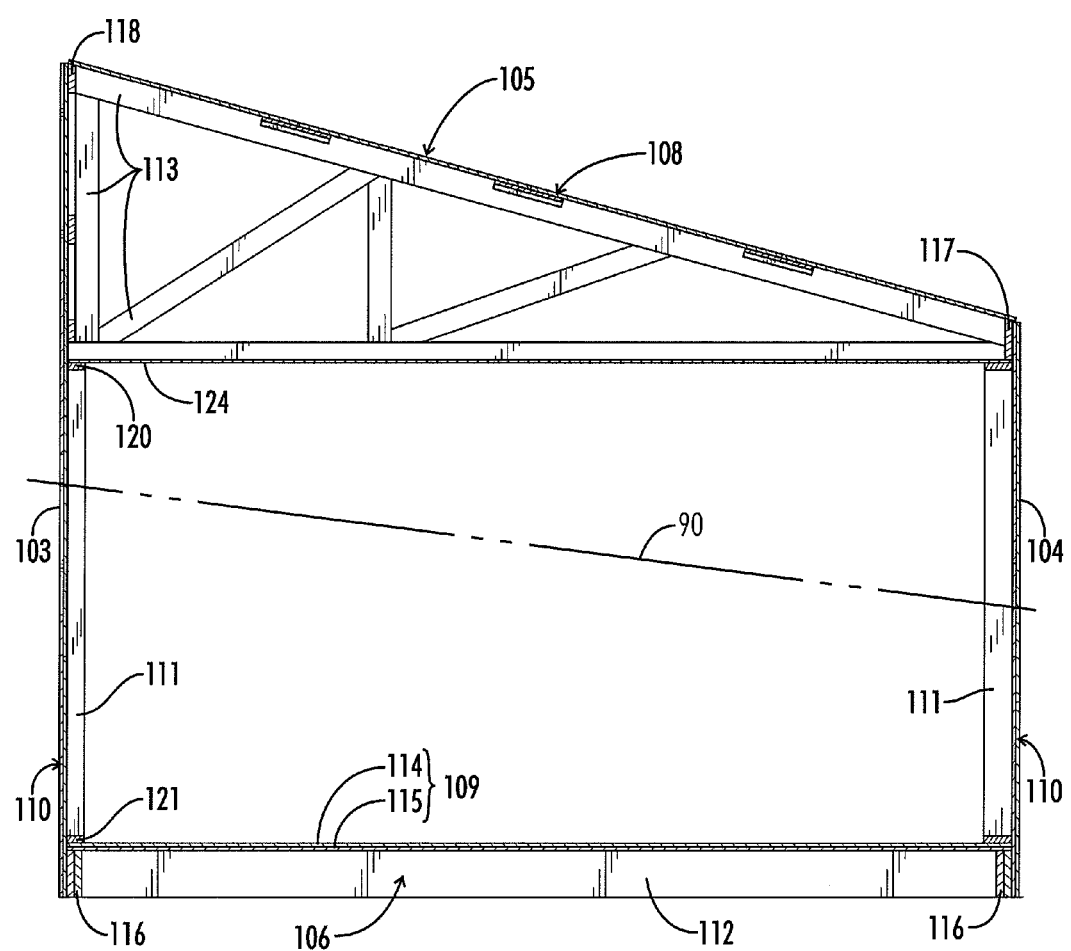
FIG. 4 shows a cross section end view of a building unit depicting the structural members that in the shown embodiment of this invention that may be unified to act as a box beam structure and also to act as a torque tube. It also depicts the approximate location of a neutral axis 90 of the cross section for vertical loadings.

In the ideal case (theoretically speaking, but not a requirement of this invention) of a square beam with constant cross section along its length, there exists a surface aligned with the upper and lower faces of the member where the stress and strain in the longitudinal direction of the beam are equal to zero. This is called the neutral surface. The neutral axis 90 is the location of this surface in a transverse section of that member. FIG. 4 shows a cross section end view of a building unit along with the approximate location of the neutral axis 90 for vertical loadings. Calculating the location of the neutral axis 90 of a building cross section depends on the size, location and composition of building elements that are integrated to form a the beam structure.

The inventors recognized that the moment of inertia of an I-beam can be maximized by maximizing the amount of structure contained in the flanges and by maximizing the height of the web separating these flanges. Those familiar with structural steel beams will know that the horizontal upper and lower faces of an I-beam are called "flanges" and the vertical portion that connects the centers of the flanges is called the "web". The inventors also recognized that the cross section of a building resembles an asymmetrical box beam structure. The inventors recognized that each of the wall structures may, if constructed with near-zero slip joints, act similarly to the vertical web of an I-beam, and the roof and floor decking may, if constructed with near-zero slip joints, act similarly to the top and bottom flanges of an I-beam.

In beam design, it is advantageous to maximize the vertical height of a beam. Transportable buildings constructed using standard techniques fail to apply this understanding to the art of building design, and do not integrate the building materials into a single structure that acts to resist bending along the length of the unit. Rather, it appears that conventional building designs almost universally consider the structure that resists bending to be the floor and the structure located in the space underneath the floor, and therefore the buildings have not been constructed to use the remainder of the building to act as part of a "beam" to increase the height of the bend-resisting structure, as taught herein. Conventional construction relies almost entirely on the steel frame 90 underneath the structure to provide resistance to bending. Exceptions in the current art are those designs that use a steel or concrete floor, a dolly, or some type of external carrier to resist the bending forces. In each case, however, the locus of structures that resist bending is below the floor decking, and the design principles focus solely on that area for increasing transportation performance of the building unit.

Applying the principles discussed above, the moment of inertia would be maximized by utilizing the full height of the building structure and thus the resistance of the building unit to bending would be increased. Assuming a building is shipped with a road clearance of six inches (15.2 cm) under the structure, the building has a mid-span deflection of two inches (5.1 cm), and it has a maximum road height of sixteen feet (4.9 m), the height of the building allows for a beam structure to be as high as fifteen feet and four inches (4.67 m). In order to have the building unit best act as a beam structure, the side walls are made rigid, like the vertical web of a beam. As discussed herein, this rigidity can be increased beyond conventional values by incorporating near-zero slip joints in the joints that unify the separate building elements to act in concert as an integrated beam structure.

For comparison purposes, consider the primary support for one instance of conventional construction manufactured homes or modular homes using a conventional steel frame 50 is a pair of steel I-beams 52. These are typically ten inches (25.4 cm) high, and the thicknesses of the flanges and web are such that the beams each weigh 9 pounds per linear foot (133.9 g cm$^{-1}$). These two beams 52 have a combined moment of inertia of 100 inches^4 (41.6 m$^4$). By contrast, it is calculated that an embodiment of the invention contemplated by the inventors could (without limitation) readily be constructed with a value of 2,322,432 inches^4 (9.665793 m$^4$) using wood as the primary structural component. Thus the invention described here could be constructed to have a moment of inertia as high as approximately 23,224 times greater than the conventional art, while omitting the steel I-beams 52. This advantage is reduced by a factor of approximately 19 because the modulus of elasticity ("E") for steel is approximately 30,000,000 pounds per square inch (207 GPa), and the value used for pine is 1,600,000 pounds per square inch (11 GPa). Thus, the structural cross section of such an embodiment of the invention could be approximately 1222 times stiffer than cross section of the conventional steel frame 50. Also, such an embodiment could be supported from only the ends, whereas the steel I-beams 52 that support the current art typically have a maximum span of thirty one (31) feet (9.4) measured from a point in front of the foremost axle 53 to the supporting trailer hitch 54. Even using primarily wood, for a building unit 100 as taught herein the wheels can be moved from underneath such that wheels 161, 162 are placed only in front of the building unit and behind the building unit. The building unit 100 would then span an unsupported distance in the same manner as a bridge spans the distance between its support piers. With the wheels so placed, the distance that would be spanned is greater than the length of the building unit—it is the distance between the lifting points of the attachment structure Returning to the analogy of the side walls 103, 104 acting similarly to the web of an I-beam, it should be noted that the I-beam web performs at least three important functions. First is to act as a relatively tall and thin beam element that provides its own contribution to the beam's stiffness. The second is to serve as a structure separating and holding the beam's flanges in place. The third is to serve as a structure to transfer shear stresses between the two flanges. The skeleton of the exterior side wall 104 is typically constructed in a factory environment as one piece, and as such, it should be suitable to being adapted, once sheathed and united in accordance with the techniques taught here, to accomplish the three functions described above for I-beam webs. The skeleton of buildings having marriage walls 103 are not typically constructed in a factory environment as one piece since they commonly have large openings between the building units, nor do they typically have sheathing 110 applied to the marriage wall 103. The marriage walls 103 of this invention are constructed in one piece to include the use wall studs 111, top plates 120 and bottom plates 121. These studs 111, top plates 120 and bottom plates 121 together with the sheathing 110 that unite the marriage wall 103 are considered temporary structures when they are installed where openings in the wall 103 between the building units 100 is desired. These temporary structures are cut out after the building unit 100 is delivered and set upon its permanent foundation. By fully covering the floor band joist rail 116, wall studs 111, top plates 120, bottom plates 121, eave rails 117, and ridge rails 118, the sheathing 110 unifies the side walls 103, 104 to accomplish the three functions of the I-beam web set forth above.

Figure 5A:
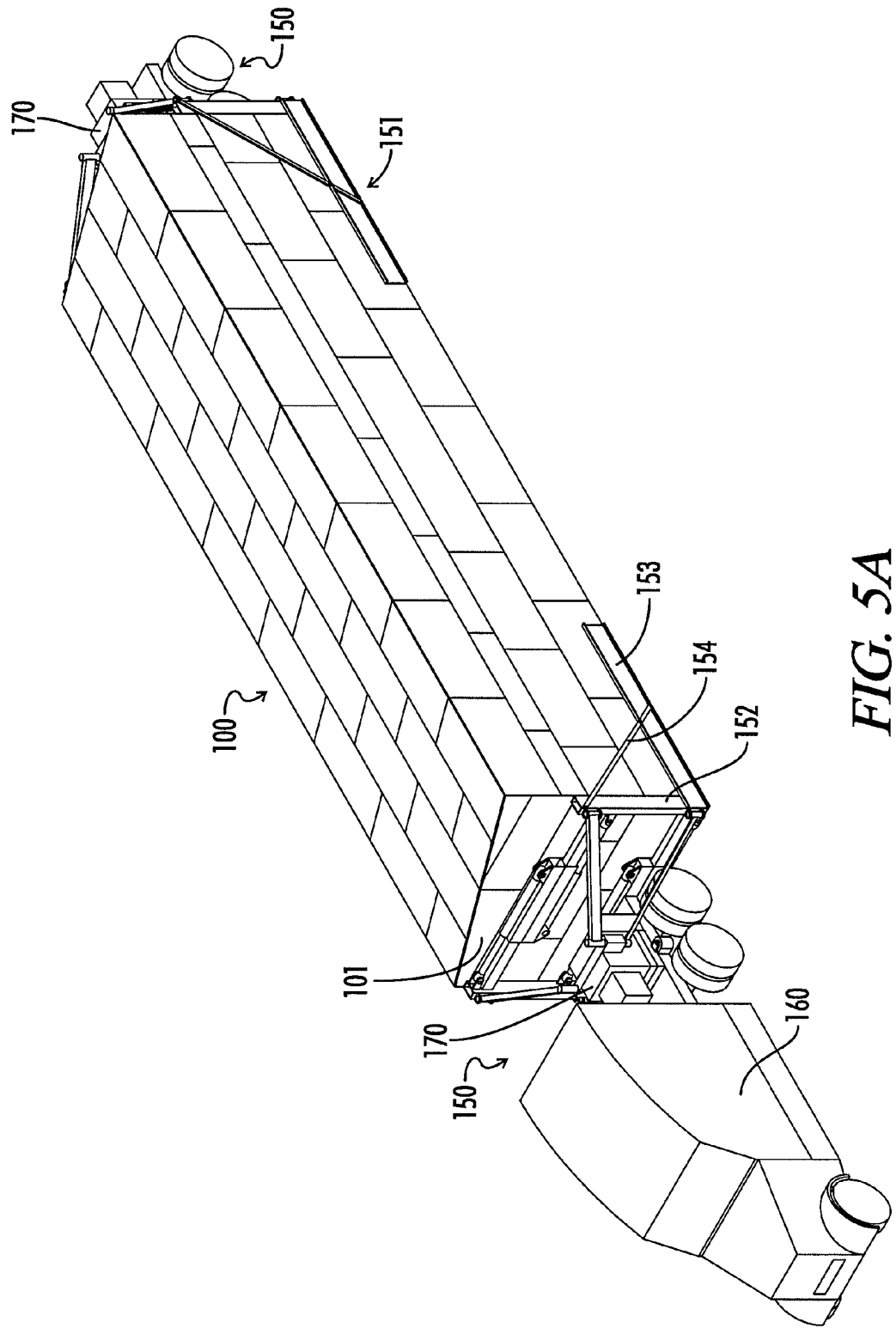
FIGS. 5A and 5B show overall isometric views of a shown embodiment of the building unit 100, the lifting frame 151, and the transport system 150 configured for road transport outbound from factory to building site.
Figure 5B:
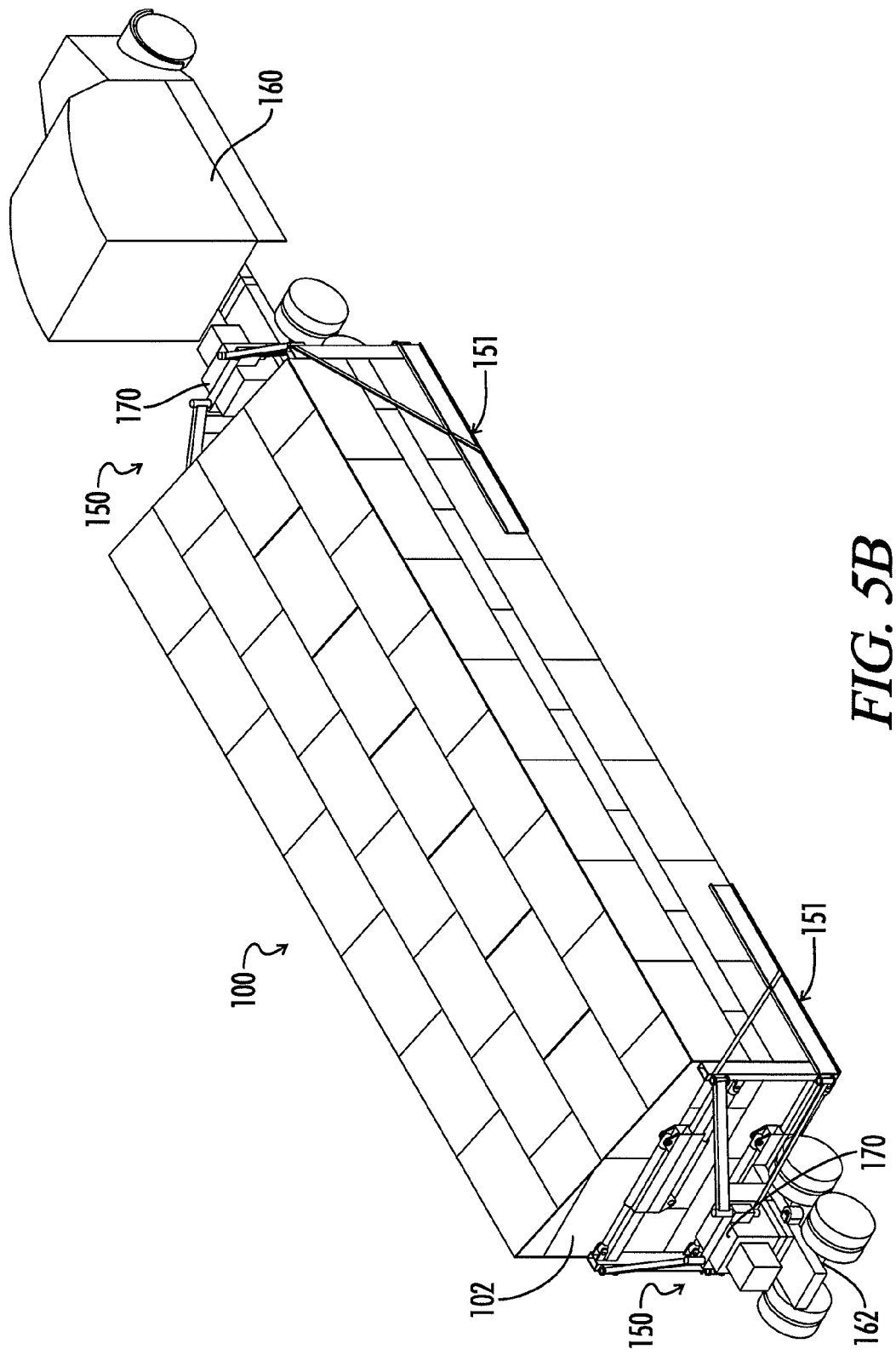

Turning to the drawings, there is shown an embodiment of a transportable building unit 100 at FIGS. 5A and 5B, in which the building unit 100 is shown elevated on shown embodiment of the transportation system 150 for movement. Discussion herein will first focus on the building unit 100 structure. As would be expected, building unit 100 has two end walls 101, 102 along the shorter dimension of the building unit 100, one of which will be at the front of the building unit 100 when transported (and called in that case a front end wall 101), and one of which when transported will be at the trailing end of the building unit 100 (and referred to as rear end wall 102). Along its longer dimension, the building unit 100 also has two side walls 103, 104, which in the shown embodiment are depicted as an exterior side wall 104 and a marriage wall 103. In FIGS. 5A and 5B, the exterior side wall 104 is on the right side, and the marriage wall 103 is on the left side. Those in the industry will understand that a marriage wall 103 is typically a wall or boundary at which two building units 100 will be joined. While the shown embodiment includes one marriage wall 103 and one exterior side wall 104, such as would be anticipated for use in what is traditionally called a "double wide or multi-section" construction, it will be understood that the building unit 100 could instead be bounded by two marriage walls 103, or alternately by two exterior side walls 104, depending upon the anticipated use of the building unit 100, either of which would be referred to as side walls. Further, building unit 100 is shown with a roof assembly 105 and a floor assembly 106 (shown in FIG. 6A, among others). While roof 105 is shown in the figures as a sloped surface, such as would be conventional for a transportable building unit, it should be understood that roof 105 could also be constructed in alternate configuration, such as a flat profile (which, for example, may be useful if the building unit 100 is intended to be used as a component of a story of a complete structure other than the top story, or if the sloped roof would be added by separate structure). The dimensions of the building unit 100 may be variable depending upon the desired implementation. The inventors contemplate building units of 30 to 60 feet (18.3 m) in length being constructed in accordance with the invention, and perhaps longer. Focus is primarily given in this detailed description to a building unit 100 that is habitable, by which we mean that it has sufficient interior space (height, etc.) to accommodate a person standing upright. For the sake of clarity, we do not intend by the term "habitable" to suggest that the building unit 100 is fully dressed or sufficient for purposes of general habitability or housing, or to import any other meaning. In fact, it is expected that a habitable building unit 100 will frequently be shipped in such a state that it would require additional construction after emplacement, including basic amenities, closures, drain hookups, water, roofing, and the like. Nevertheless, if it is of a size that it could accommodate a person, it would be considered "habitable". Of course it is anticipated that most economical use of the principles taught herein will be in application to building units 100 that have room-sized interiors, whether further compartmented into individual rooms or not.

The basic skeletal frame of the building unit 100 may be constructed in a traditional manner, with the basic frame outline defined by perimeter band joist rails 116 at or below the floor deck 109 level, corner posts at the exterior corners and extending toward the roofline, and roof rails 117, 118 at or below the roof line. Wall studs 111 provide the skeletal structure of the side walls 103, 104 and the end walls 101, 102; floor field joists 112 connect to the band joist rails 116 and provide skeletal structure for the floor assembly 106; and rafters or trusses 113 and roof rails 117, 118 provide skeletal structure for the roof assembly 105. In the shown embodiment, these components are constructed of pine or other wood, though it will be understood that certain composites or synthetics may be applicable. In place of the truss 113, if the intended location of the building unit 100 renders it desirable, ceiling joists could be used to provide a flat (or other) configuration of the roof 105, rather than a sloped configuration as shown.

Figure 7A:
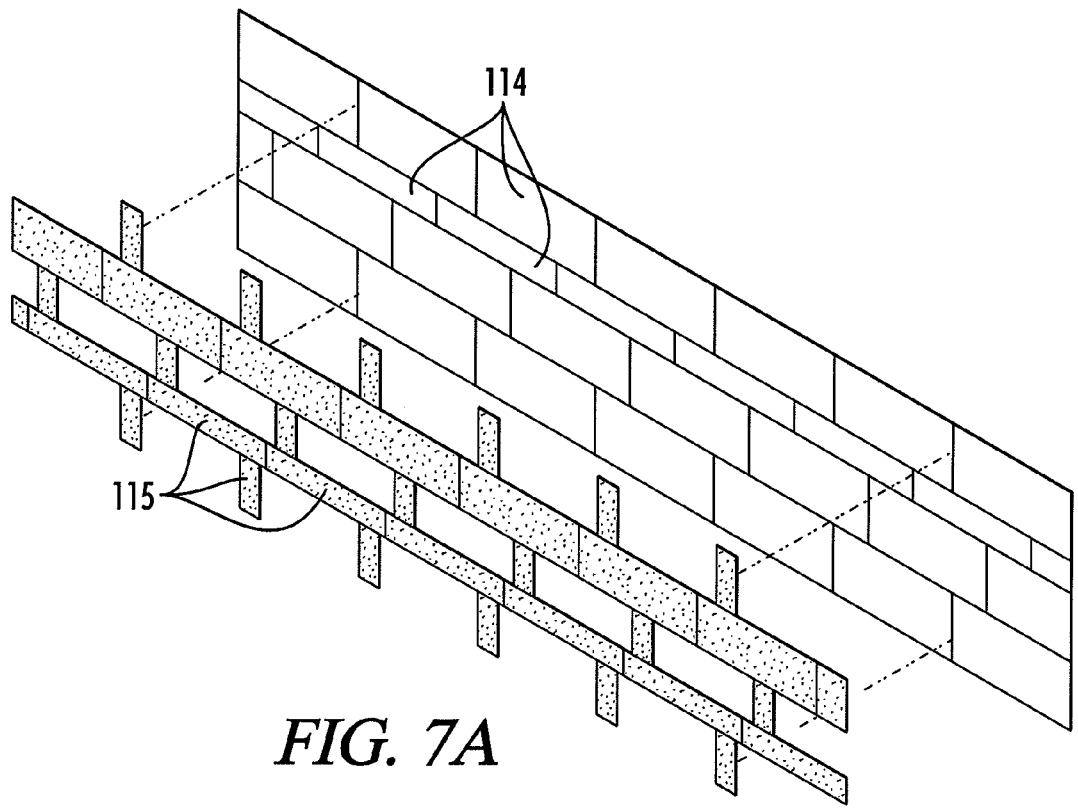
FIG. 7A shows an isometric view of how sheathing 114 could be arranged in a possible typical layout for the marriage wall of a building unit to stagger joints, and it also shows how the scab panels 115—shown as shaded panels—could be arranged to overlay joints and to unify neighboring panels 114.
Figure 7B:
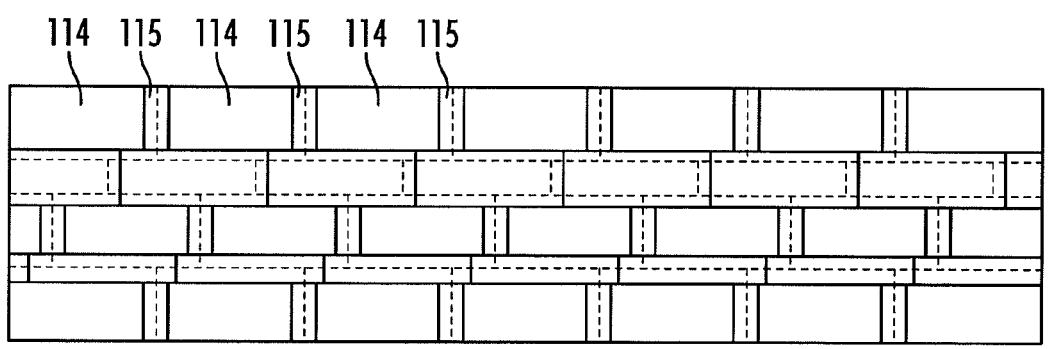
FIG. 7B shows a flat-on view of the panels 114 and scab overlays 115 shown in FIG. 7A in a possible typical layout for the marriage wall 103 of a building unit 100. The outlines of the scab overlays 115 (the second layer) are depicted with solid lines, and the outlines of the sheathing panels 114 (the first layer) underneath are depicted using dashed lines.
Figure 8A:
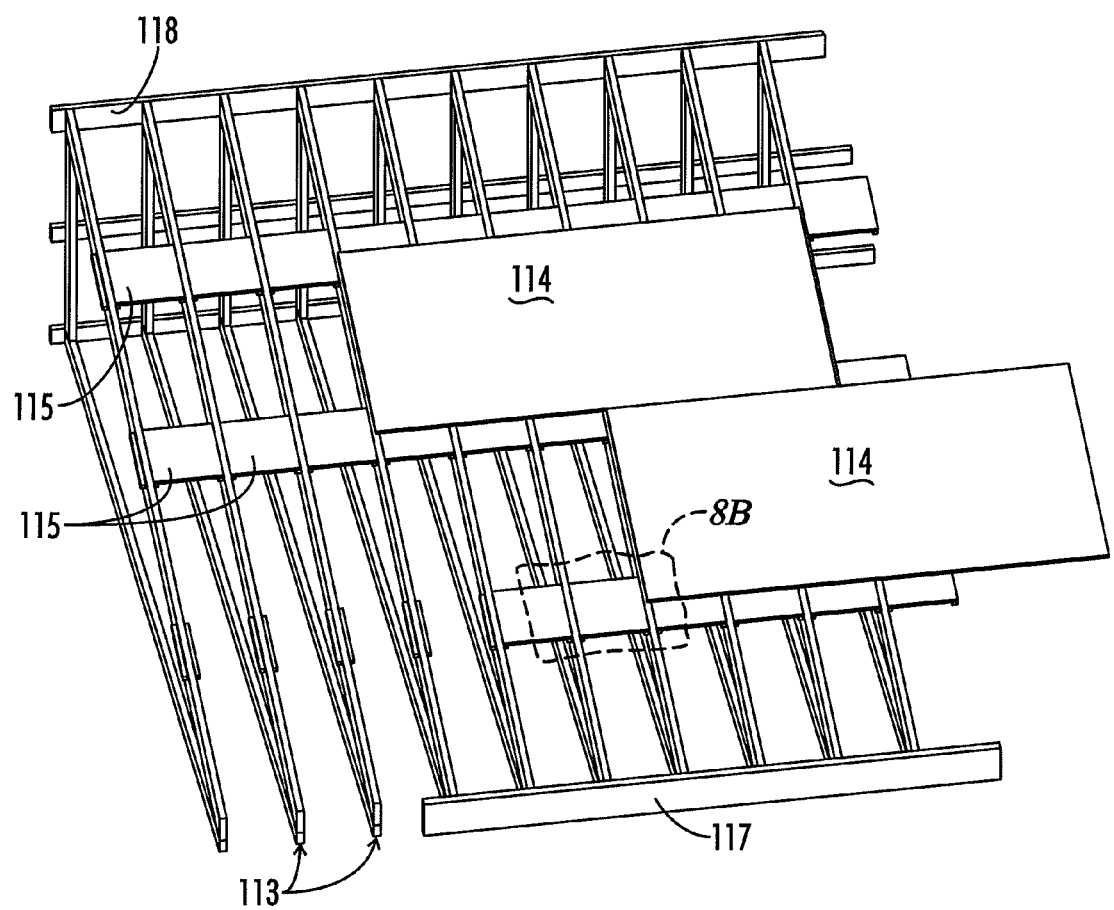
FIG. 8A shows an isometric view of how the roof decking 114 may be unified into a single structure 108 using scab panels 115 on the underside of the roof decking 114.
Figure 8B:
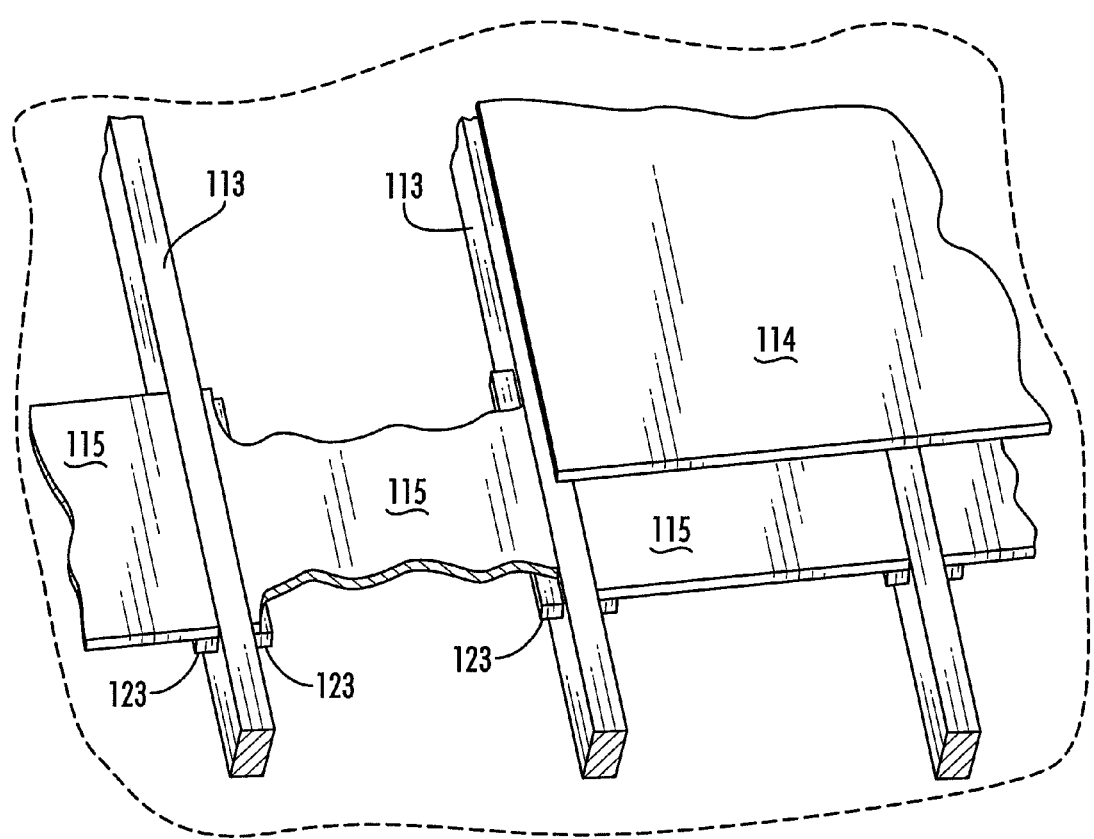
FIG. 8B is a close up view showing additional detail of FIG. 8A. Some parts of the truss structure have been removed in both figures for clarity.
Figure 8C:
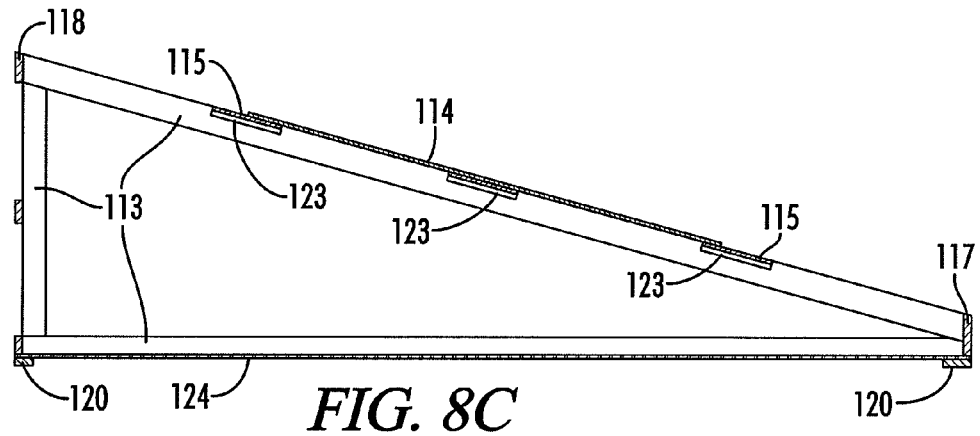
FIG. 8C shows a cross section end view of the roof decking 108 and roof truss 113. Some parts of the truss structure 113 have been removed for clarity, and not all wall sheathing 114, roof decking 114, and scab panels 115 are shown.
Figure 8D:
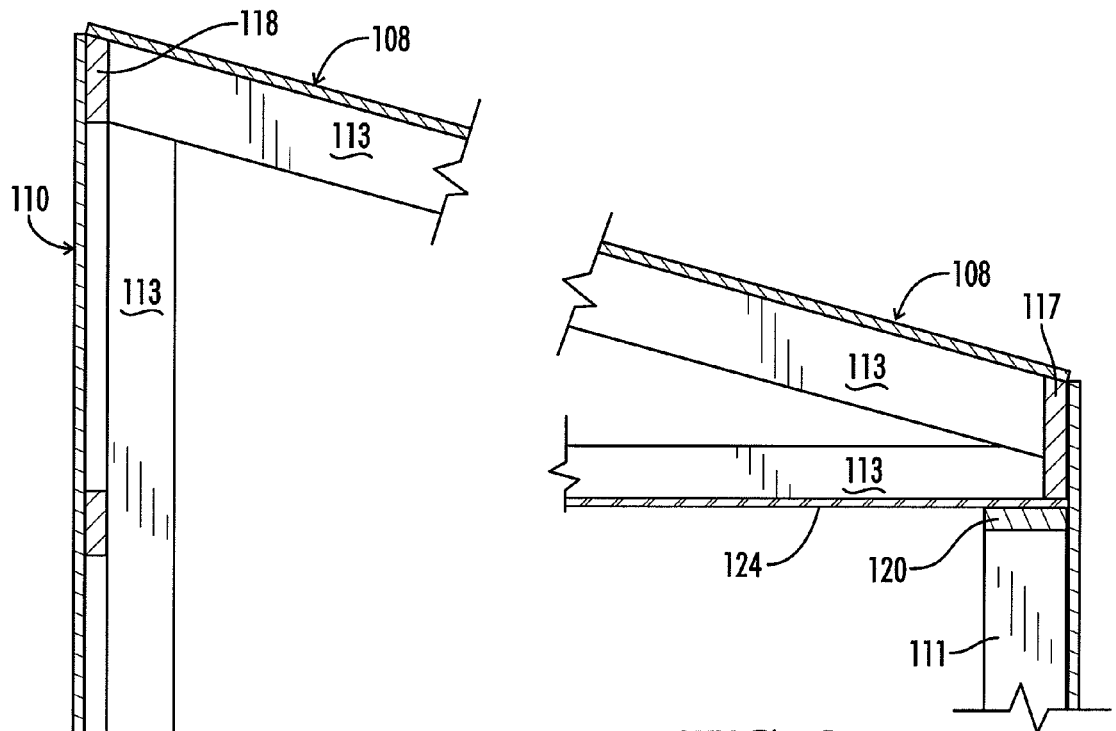
FIG. 8D shows a close up view similar to the right side of FIG. 8C. It shows a cross section end view depicting additional details of how the roof decking 108 and exterior sheathing 110 may both attach to the eave rail. Some parts of the truss structure 113 have been removed for clarity.
Figure 8E:
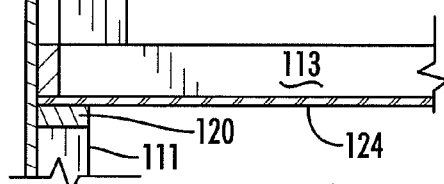
FIG. 8E shows a close up view similar to the left side of FIG. 8C. It shows a cross section end view depicting additional details of how the roof decking 108 and marriage wall sheathing 110 may both attach to the ridge rail 118. Some parts of the truss structure 113 have been removed for clarity.
Figure 8F:
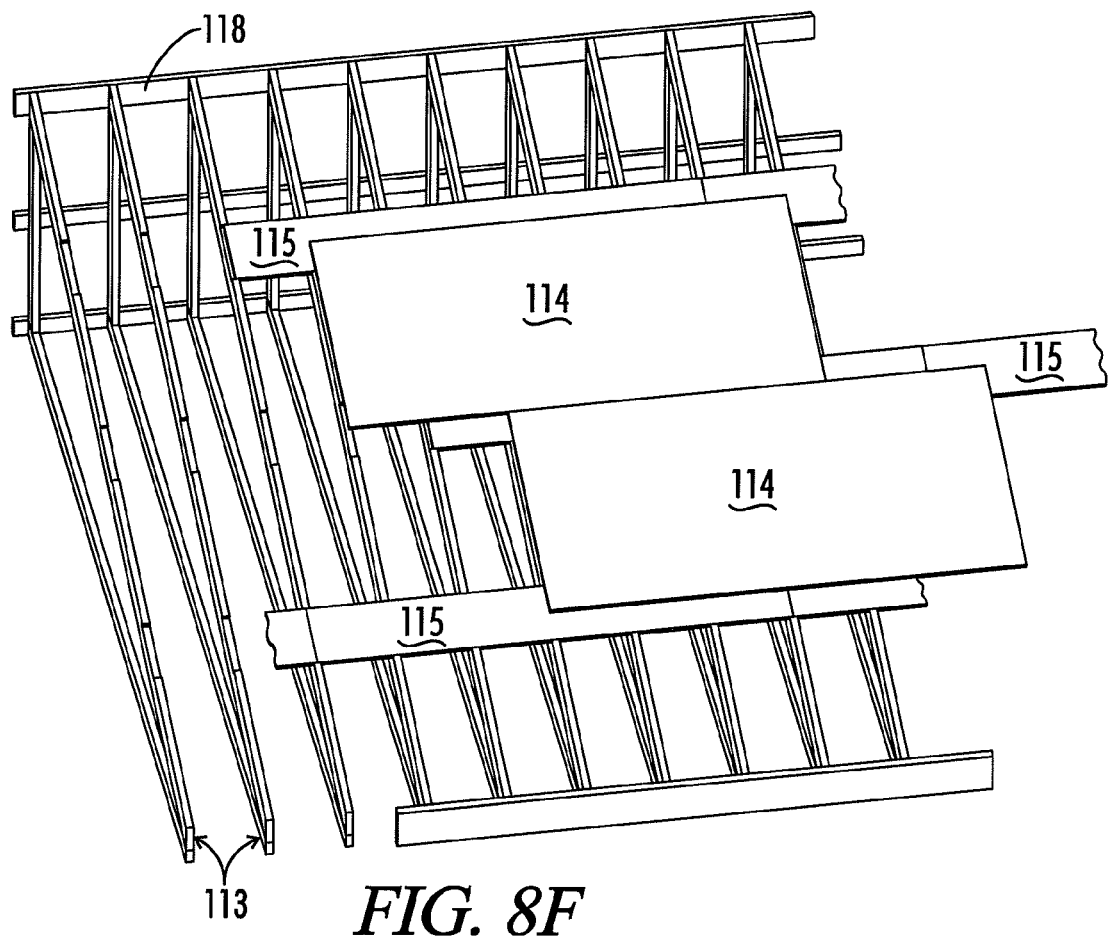
FIG. 8F shows an isometric view of an embodiment or method of embedding the roof scabs 115 into dado reliefs cut into the roof truss 113. Some parts of the truss structure 113 have been removed for clarity.
Figure 8G:
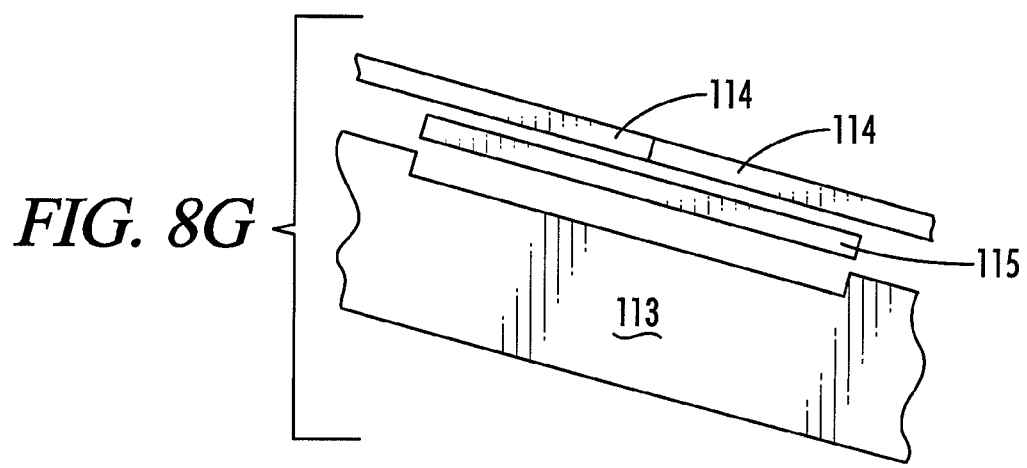
FIG. 8G is an end view of the scab joint depicted in FIG. 8F. Seen in this view are two sheets of roof decking 114, the end of the scab panel 115, a ledger board 123, and the side of the truss's 113 top chord into which is cut the dado relief.

Attached to the skeletal structure are sheathing panels 114 made of plywood, OSB, or other suitable material. In at least one of the side walls 103, 104, the sheathing panels 114 are joined to one another using near-zero slip joints between individual panels, or between the skeletal structure and the sheathing panels 114. Unification of the separate panel structures 114 that are combined to form the floor roof deck 108, floor deck 109, and side wall sheathing 110 may be accomplished by bridging the gaps or other joints at the edges of the sheathing panels 114 with overlays 115 called "scabs" or scab panels. FIG. 7A depicts one example of a layout pattern possible for marriage wall 103 sheathing using standard wood sheet goods panels measuring four feet (122 cm) by eight feet (244 cm). The plywood sheets 114 in this layout pattern are turned so that the longest dimension is oriented horizontally. This layout pattern differs from the pattern commonly used in conventional construction in which it is standard to orient the sheets 114 with the longest dimension running vertical. FIG. 7B shows a flat-on view of the sheathing 114 layout and the scab 115 panels for marriage wall 103 discussed in the example above.

Figure 6A:
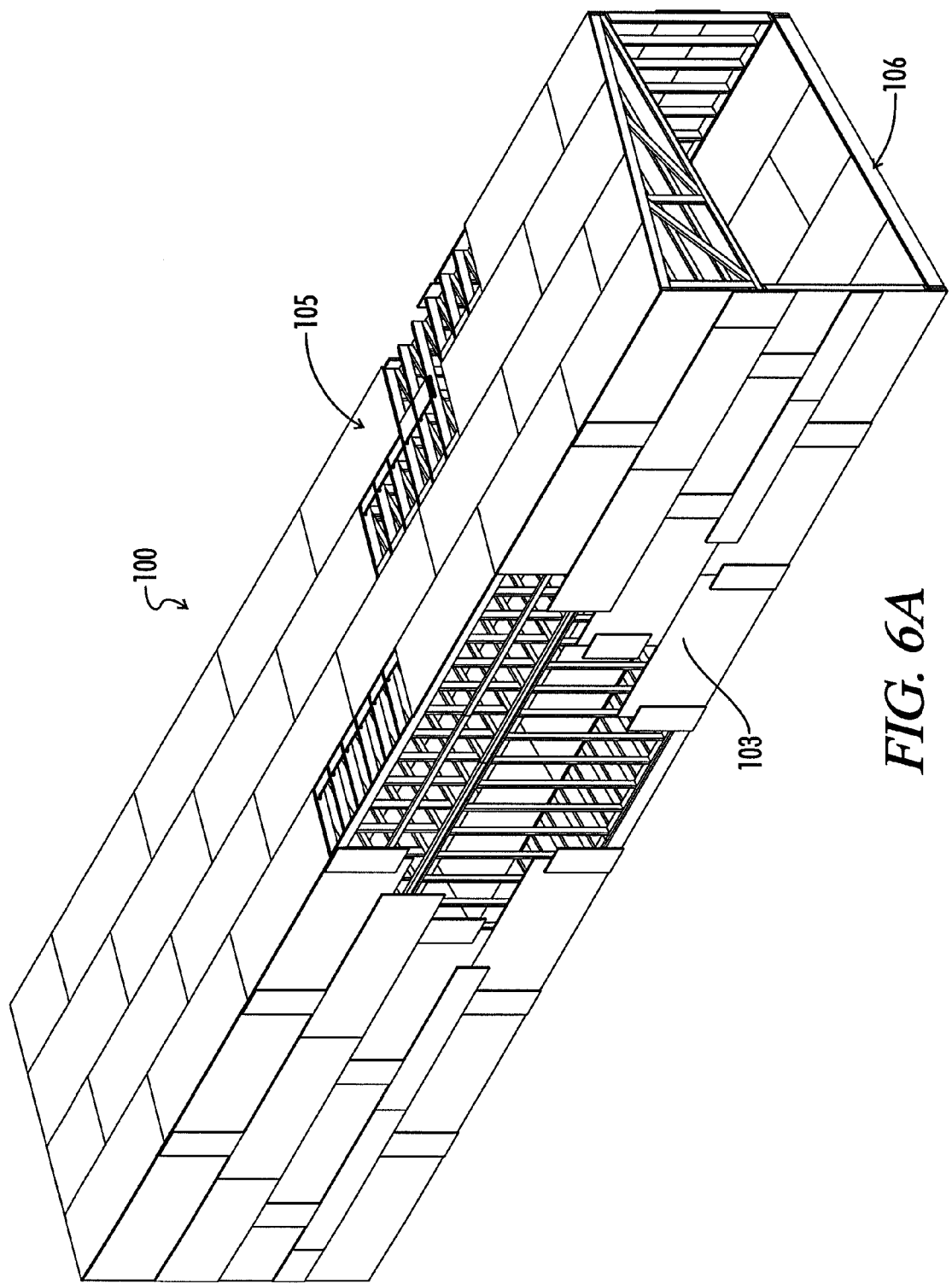
Figure 6B:
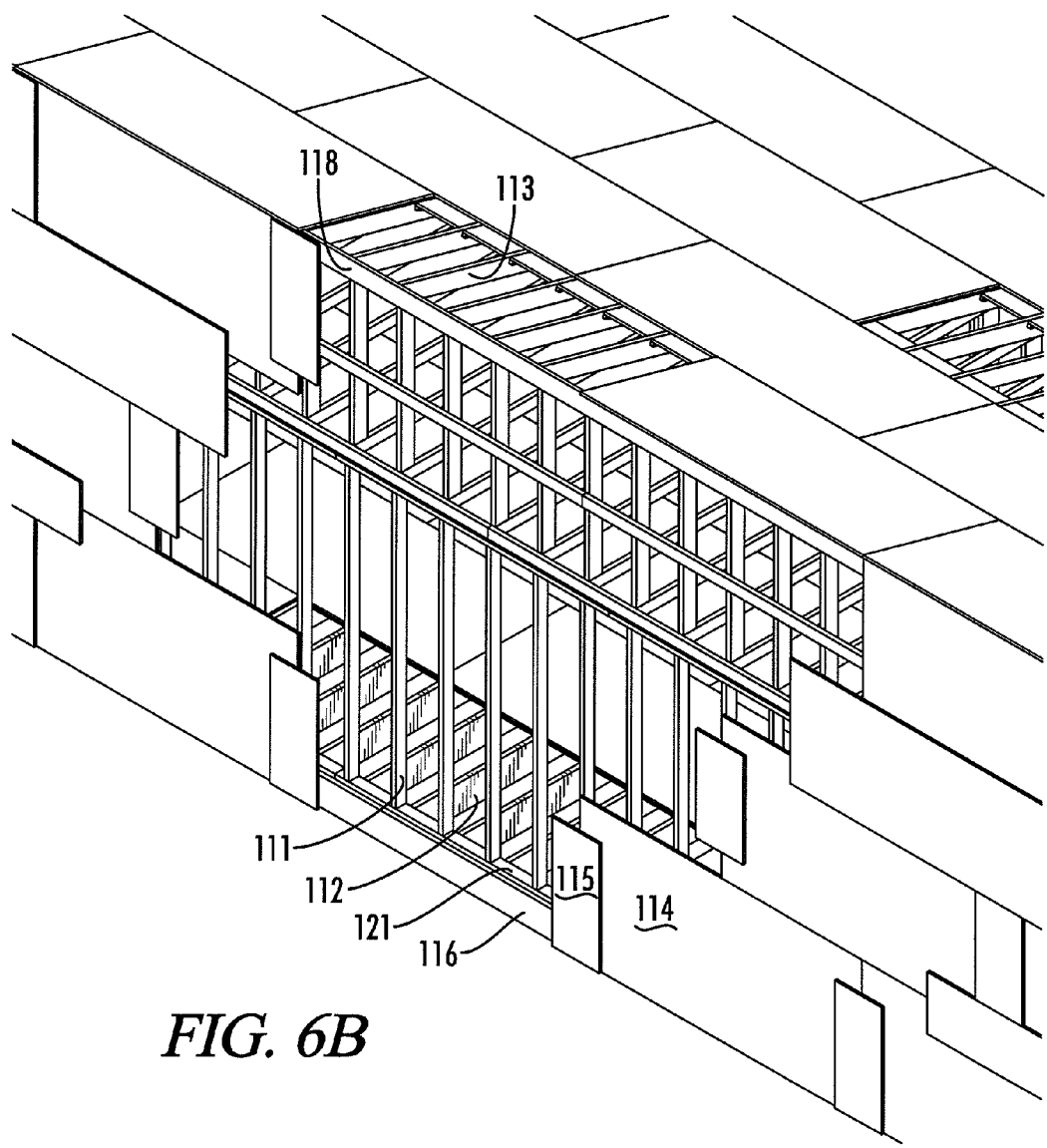
Figure 6D:
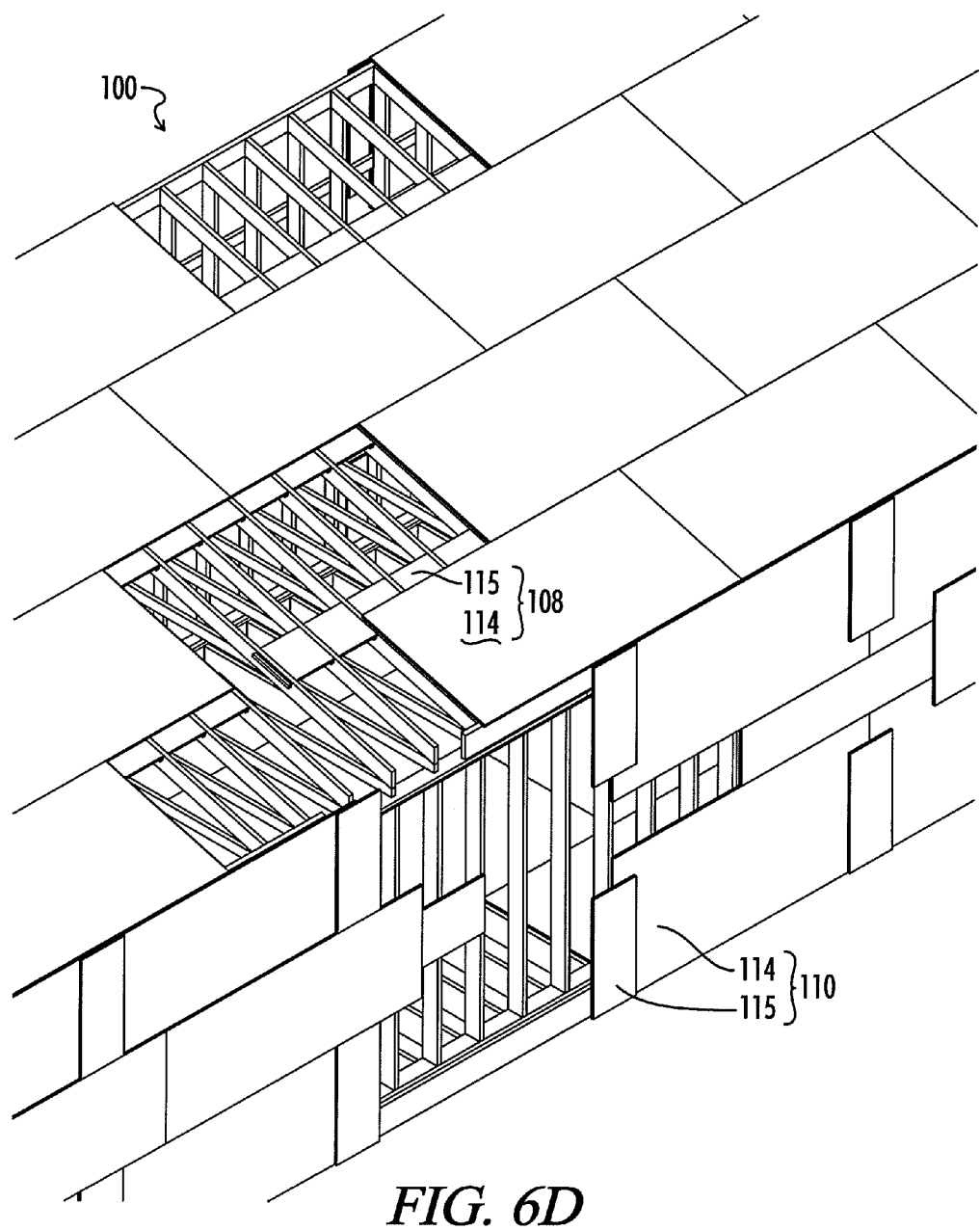

When the surfaces to be joined between the scabs 115 and the panels 114 are properly constructed so as to be "zero-slip joints", the layout pattern shown in FIG. 6A delivers greater strength and stiffness, especially to a building structure 100 that unites the separate sheathing panels 114 into integrated structures 108, 109, 110. The layout shown in FIG. 6A has half the number of joints between panels 114 aligned in a row in the horizontal direction when compared to the standard layout. This means that stresses that act horizontally in a structure are transferred through half as many joints between structural elements. Therefore, there is half the opportunity (compared to conventional construction) for weaknesses or slippage that occurs in such joints to degrade to the overall stiffness and strength of the building unit 100 as it acts as an integrated beam while it is lifted during transport. Secondly using a layout pattern similar to that shown in FIG. 6A, in the case of using a composite wood structure such as plywood, a larger percentage of the longest structural fibers are oriented in the direction in which the largest stresses will be introduced to the structure. From its ends, some of the largest stresses that the building unit 100 will experience as it is lifted during transport or emplacement on a foundation are compression acting horizontally in the topmost portions of the structure 100 and tension acting horizontally in the lowest portions of the structure 100. The portions of the structure 100 that are located below the neutral axis 90 shown in FIG. 4 will experience primarily tension when the building unit 100 is lifted from points near the end walls 101, 102. The portions of the building unit 100 that are located above the neutral axis 90 shown in FIG. 4 will experience primarily compression.

Where plywood is used as the sheathing panel 114, it is usually sufficient to also construct the scabs 115 of plywood. The scabs 115 are typically strips of plywood that are adhesived (and possibly fastened) over the edge joints of the panel 114 structures (decking for the roof 105 and floor 106 and sheathing for the side walls 103, 104). If desired, the scabs 115 need not be the same material as the sheathing panels 114, and in fact could simply be boards or other substantially rigid components. The scabs 115 should best be sufficiently large so that the forces to be transferred between adjacent sheathing panels 114 are not limited by the strength of the adhesive. The scabs 115 overlap and are adhesived to a sufficiently large area on adjacent sheathing panels 114 to ensure that the adhesive joint is not the weakest stress point in the chain of joined structural elements. In other words, the shear, compressive and tensile strengths of the scab joints may be stronger than the corresponding strength values in a single thickness of the sheathing 114 and scab 115 parent materials. This can be accomplished by sizing the scab panel 115 to provide a sufficiently large contact area between the scab 115 and the adjacent sheets of sheathing 114.

Ideally, the adhesive used to join these parts should be selected with assessment of strength in shear and other mechanical properties so that the adhesive joint itself is not the weakest link in the structure. The adhesive used is selected with respect to its ability to resist meaningful slippage and shear. Most preferably, the adhesive is sufficiently strong and stiff so that the parent plywood material will fail or tear away before the adhesive joint itself will fail. One criteria useful for selecting an appropriate adhesive may be the shear strength of the parent material. Plywood made primarily of pine may be used for the sheathing 114 and scabs 115 used in the shown embodiment. The shear strength parallel to the grain for some common species of pine is commonly given as ranging from 700 pounds per square inch (4.8 MPa) to greater than 1700 pounds per square inch (11.7 MPa). Common construction adhesives, such as typical latex-based elastomeric mastics, have typical shear strengths of around 400 pounds per square inch after cure (2.8 MPa). Therefore they are not preferable to best take advantage of the techniques taught in this invention. The inventors prefer to use an adhesive with a shear strength rating greater than the parent material being joined. One candidate adhesive that the inventors currently believe to have desirable mechanical and other properties is a water-resistant, two-part crosslinking polyvinyl acetate emulsion that is commonly used to assembly joints for cabinets. The shear strength for this candidate adhesive is given at greater than 3000 pounds per square inch (2.1 MPa). While the inventors prefer the use of high-strength adhesives, they can envision that adequate bonds approaching the zero-slip criteria may be formed using adhesives with shear strengths as low as 700 pounds per square inch (4.8 MPa), and possibly even lower.

The side wall sheathing 110, floor decking 109, and roof decking 108 that are unified using such scab joints are considered to act conceptually as single sheets of plywood material that is effectively the same size as the building's floor 106, side walls 103, 104 and roof 105, respectively. Thus a building unit 100 that is 16 feet (4.9 m) wide by 60 feet (18.3) long can be considered conceptually to have side walls 103 and 104 made using a single sheet of plywood that same size where constructed using these principles. The floor 109 and roof 108 decking may be considered similarly as single pieces of over-sized plywood. In the shown embodiment, each of the side walls 110 as well as the floor 109 decking and the roof 108 decking, are unified among their respective components using this near-zero slip construction technique. FIG. 7B shows how the joints between the neighboring scabs 115 are staggered so they are not aligned with the joints between neighboring pieces of sheathing or decking 114 to which the scabs 115 are affixed.

It should be noted that while the inventors believe the greatest strength and stiffness of a building unit 100 may be obtained by applying scab 115 panels over every joint where neighboring panels 114 abut, economic or other considerations may give cause to omit certain scab 115 panels. The inventors believe that the majority of the joints between neighboring panels 114 should be assembled using near-zero slip construction or methods. Strategic arrangement of these near-zero slip joints may provide for a continuous chain of near-zero slip connections joining neighboring panels 114 between the end walls 101, 102 of the building unit 100. Even where not all joints are made near-zero slip, a chain of near-zero slip joints could be made to create a continuous load path from end-to-end. This is sufficient to unify the separate structural elements to act as an integrated beam.

Even a broken chain of such near-zero slip joints would have some value in increasing transportation performance of the building unit 100. FIGS. 7A-D show four views of a building unit 100 with several structural elements removed to allow examination of the interior parts. FIGS. 8A-G provide similar views of the roofing structure.

Scab 115 panels may be used to unify into near-zero slip joints panel structures 115 that lie in the same plane. The integrated floor deck 109, roof deck 108 and side wall sheathing 110 lie in separate planes, and such intersecting structures may also be joined together in a near-zero slip relationship to further enhance structural integrity of the beam-like function of the building unit 100. Such near-zero slip junctures may be obtained for structures lying at an angle to one another (or otherwise out-of-plane) by affixing both such components to a common structure shaped so that the faces running down the length of the common structure are aligned with the angled or out-of-plane panels 114. The integrated floor deck 109 and side wall sheathing 110 may be joined by attaching both perimeter band joist 116. Likewise, the integrated side wall sheathing 110 and roof decking 108 are joined by attaching panels of each to both the rail structures 117, 118. The term eave rail 117 is used to describe the structure located at the intersection of the roof 105 and the exterior side wall 104. The term ridge rail 118 is used when referencing the structure located at the intersection of the roof 105 and the marriage wall 103. (The eave rail 117 and the ridge rail 118 are commonly referred to as roof rails.) FIG. 4 provides a cross-section view of the building unit 100 in which the location and connectivity of the perimeter floor band joist rail 116, and the eave rail 117, and the ridge rail 118 can be seen. In the shown embodiment, both rails 117, 118 are constructed by using at least one (perhaps two or more) pieces of lumber whose top surface has been beveled to match the pitch of the roof 105 (where the top surface of the building unit 100 is to be a roof.) In a manner similar to the method used to construct the perimeter floor band joist rail 117, the lumber used to fabricate these rails 117, 118 are the longest pieces available, they are joined at the ends using gang nails or similar fasteners, and (in cases where more than one thickness of lumber is used) the joints of the rail boards 117, 118 are staggered with respect to each other and adhesive is used to unite the boards to act as a single structure. As shown, these wall-floor and wall-roof junctures are secured with adhesive, in addition possibly to mechanical fasteners such as nails. The roof rails 117, 118 should provide adequate surface area between the roof decking 108, the side wall sheathing 110, and the roof rail structures 117, 118 to ensure that the joint is sufficiently strong. The floor 108 and the side wall sheathing 110 typically intersect at a right angle, and standard rectangular cross section perimeter band joists (such as a 2 inch (5.1 cm) by 10 inch (25.4 cm) piece of lumber, which may be doubled or multiplied) are well suited to use in joining those perpendicular surfaces. Any panel structures that intersect at angles other than right angles (such as the side wall 110 to roof 108 deck joint) can use a structure that has been beveled so that the slope of one surface matches the required angle.

Figure 2A:
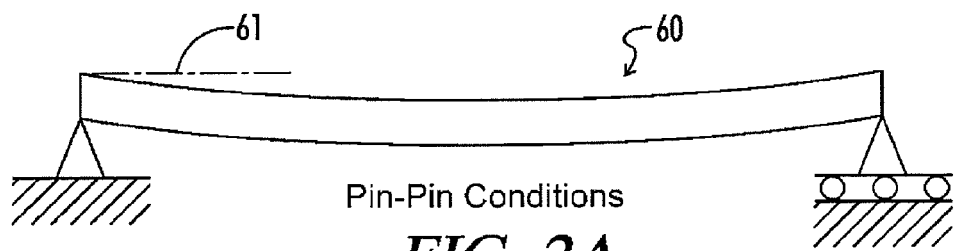
FIG. 2A shows a side view of an idealized beam 60 supported at the ends with simple pin supports.
Figure 2B:
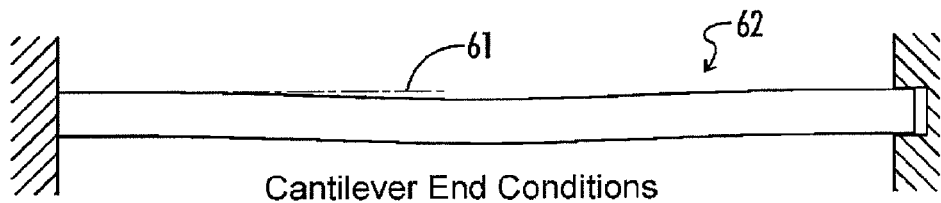
FIG. 2B shows a side view of an idealized beam supported at the ends with cantilever supports.
Figure 2C:
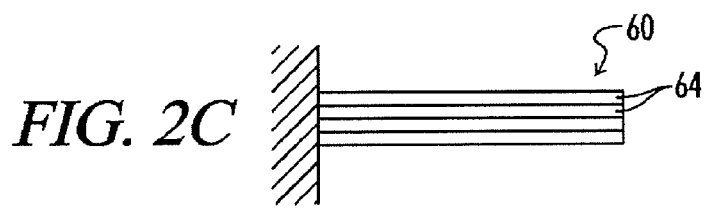
FIG. 2C shows a side view of an idealized composite beam 63 made of 4 separate beam elements 64 that are supported on the left side with a cantilever support.
Figure 2D:
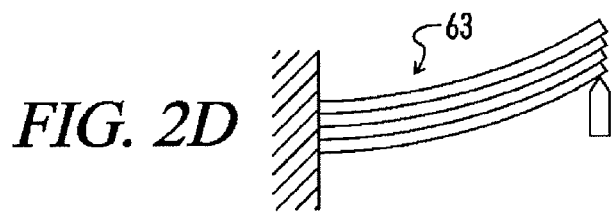
FIG. 2D shows the beam in FIG. 2C deflecting vertically upwards as the beam elements 64 act independently of each other.
Figure 2E:
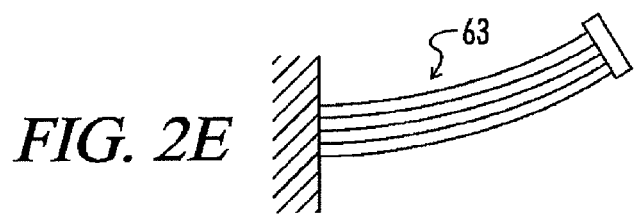
FIG. 2E shows the beam 63 in FIG. 2C with the beam elements 64 unified and acting in concert to resist an uplifting force.
Figure 3:
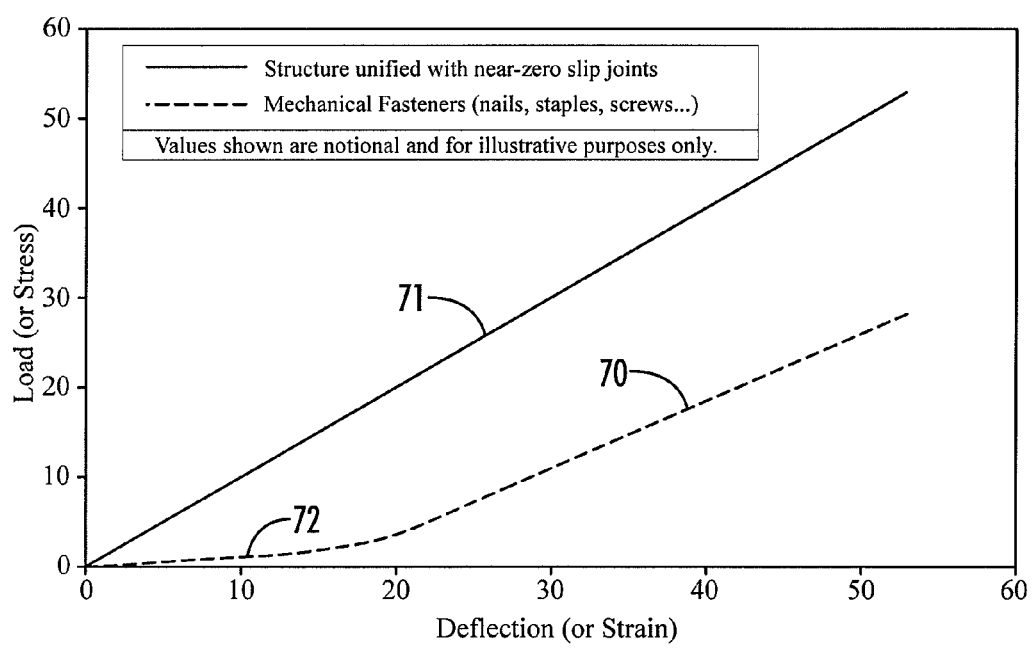
FIG. 3 is an idealized stress-strain or load-deflection graph showing the different behavior exhibited by multi-element structures joined using only conventional mechanical fasteners such as nails, versus the behavior exhibited by multi-element structures that are unified by using near-zero slip attachments as suggested herein.

Because of the unification of the separate sheathing panels 114, each wall 103, 104, roof 105, and floor 106, each of these overall structures may act as a single unified structure with relatively little slippage or slack, rather than as a collection of independent members all slightly slack from one another, and in the aggregate, substantially slack. Moreover, by also unifying those overall wall 103, 104, floor 106, and roof 105 structures to each other, the building unit 100 may be caused to act as a single structure and therefore to better function as a beam having a height equal to that of the building 100. These unified sub-structures 103, 104, 105, 106 thus may act as a single unified macro structure 100 providing greater stiffness than can be achieved with the conventional building methods. It may be useful to draw an analogy between a book and a piece of lumber that have identical dimensions. FIGS. 2C-E may prove useful for this discussion. The wood fibers in each page of a book are unified to form separate pages, and the pages are relatively strong in tension in two dimensions. Each page is analogous to the separate cantilever beam structures 62 in FIG. 2C. Book pages offer virtually no resistance to bending forces, and FIG. 2D depicts how they act separately. In contrast, the piece of lumber resists bending along all 3 axes because the wood fibers are interwoven or otherwise integrated, enabling them to transfer stress throughout the wood and act as an integrated, unified structure. The piece of lumber is analogous to the unified structure shown in FIG. 2E. The building 100 of this invention is analogous to the piece of lumber whereas conventional art structures tend to act separately like the individual pages of the book.

Without limiting the potential scope of the invention, the inventors practice unification of the floor 106 with near-zero slip joints slightly differently than they do the sheathing panels 114 of the side walls 103, 104. Specifically, floor decking 114 is unified to act as a single membrane by laying a second layer of floor decking 114 over the first, rather than merely using scabs 115 (both the second floor 106 layer and the scabbing 115, even though scabbing 115 may not uniformly cover the entire first layer of panels 114, can properly be called "layers"). However, like the scabbing layer, the second layer of flooring panels 114 is arranged so that the edges of the second layer sheets 114 are not aligned with those of the first layer. The second layer of floor decking 114 acts essentially as a large scab 115 connector that transmits forces across the joints in the first layer of floor decking 114. As described, the second layer of floor decking 114 may comprise a full sheeting as opposed to using scab connectors only at the edges of the first layer of floor decking 109, which may have advantages for the speed of assembly as the manufacturing facility's flooring station is not slowed down, dados (or reliefs) would not need to be cut into the floor joists 112 so that the floor 106 would remain smooth. This approach (using two full-sized layers) also allows the floor 106 to be one thickness in all locations. When modifying the floor plan, the designer would not have to consider differences in the floor 106 deck thickness when locating plumbing drains that penetrates the floor 106. Of course, if economy of cost or weight, or other factors, provide incentive, the floor 106 could be constructed using the scab method, rather than the uniform complete second layer. If so desired, it likely would be desirable to place the scabs 115 on the underside so that the upper surface of the floor 106 is relatively flat. In such a case, the builder may choose to dado or otherwise create spacing in the floor joists 112 to accommodate the scabs 115 and allow greatest contact between floor panels 114 and floor joists 112. Similar techniques could be used, if desired, to provide a smooth exterior surface to the side walls 103, 104 by locating scabs 115 between the first panel of wall sheathing 115 and the studs 111 of the wall.

Additionally, the inventors enhance the effects of the unified floor 106 by doubling the perimeter band joist 116, and securing the doubled boards (being an inner rail and an outer rail) to one another in a near-zero slip joint, to also have that joist 116 act as a single structure. Using the longest available structural members to fabricate the perimeter band joists 116 provides the greatest lengths of uninterrupted structural fibers, and this enhances stiffness and strength. The board end joints are staggered between the inner rail and the outer rail so that they do not align. These boards are joined at the ends using gang nails or similar fasteners in the same fashion as current art manufactured or modular building joist rails. The boards forming the perimeter band joist 116 are adhesived together with a suitable adhesive in addition possibly to the nails or other fasteners used in the current art manufactured or modular building construction. This adhesive unifies the doubled perimeter band joist 116 to act as a single structure. Thus we create a structure that serves to tie the sheathing 114 (of both the marriage wall 103 and exterior side 104, if desired) to the floor deck 106 via the perimeter band joist 116. The sheathing 114 completely covers the outside board of the perimeter joist rail 116, and it is attached with adhesive and nails. When using 2 inch (5.1 cm) by 10 inch (25.4 cm) joist rails, the vertical contact area between these two is 9.5 inch (24.1 cm) (so-called 2 inch (5.1 cm) by 10 inch (25.4 cm) boards actually measure only 1.5 inch (3.8 cm) by 9.5 inch (24.1 cm)). The floor decking 114 contacts the top surface of both the inner rail and outer rail of the perimeter band joists 116 (or of the sole structural member of the perimeter band joist, if it is not doubled) to create a near-zero slip joint. Thus there is only 3 inch (7.6) of total contact area on each side. By doing so for the perimeter band joists 116 of each side, and constructing the floor 106 deck with near-zero slip construction, a near-zero slip connection between the roadside and curbside perimeter band joist boards 116 is created, which avoids slippage in the connection between the floor decking 114 and the perimeter joint band 116 experience as the building 100 is lifted for transport.

Using the construction described herein, it is possible to eliminate the steel frame 50 from the building unit. If desired, the building unit 100 may carry its own weight without an integrated steel frame 50, a flat-bed, or a dolly or other undercarriage underneath (each being called an "under frame" for convenience). This can be accomplished without placing wheels directly below or to the side of the building unit 100. As a result, it is possible to transport the building unit 100 with the floor deck 106 height (relative to the road) lowered beyond that of conventional transportable buildings, since the only structure that needs to be beneath the floor deck 106 is the floor joist system 112, 116. This, in turn, means that the height of the ceiling can be lowered (relative to the road) while maintaining standard internal height of the ceiling, leaving more room for the attic or space above the ceiling. Because the lowest point of the roof 105 can therefore be effectively lowered closer to the road without compressing the internal dimensions, it is possible to remain within road-travel height for the overall building unit 100 as transported, while increasing the vertical distance occupied by the roof 105, meaning that the slope of the roof 105 can be increased for aesthetic, zoning, or functional reasons (without the need for hinged roofs or the like). Effectively, then, by removing the under frame from the building unit 100, the floor deck 106 and the joists 112, 116 can be lowered, increasing the total height of the building unit 100 for shipment, and therefore allowing the unit to carry a higher side wall 103, 104 and steeper roof pitch while remaining within the DOT guidelines for transport (if the building unit is to be transported with a roof 105 that is constructed in the factory). Without limiting the scope of the invention, it is useful to note that this process allows the building unit 100 to be built with a flat floor 106 the entire way through the assembly process. The beams 52 used as the backbone of the steel frames 50 used in conventional transportable buildings are sometimes predeflected or bent prior to entering the assembly plant and having any part of the building put upon them. This predeflection may be seen in FIG. 1. When the floor deck 106 is first applied to the steel frame 50 in conventional construction, the floor 106 assumes the wavy shape of the frame 50. The floor 106 gradually flattens under the as building assemblies and furnishings are added. Considerable labor cost is invested to accomplish this beam 52 predeflection. If the steel frame 50 is not predeflected, then the manufacturer will normally use steel reinforcements to prevent the frame 50 from sagging after construction of the building unit 100 is complete. This method also demonstrates considerable labor and material cost.

One possible advantage of eliminating the steel frame 50 and it associated sloping floor 106 is that all structures may be attached flat and square from the start. Since deflection is eliminated as the assemblies are brought together, there is no movement between joined parts. This eliminates the stresses caused simply by the floor 106 deflecting from its initial pre-bent state to the final flat state.

Of course, the ability to eliminate or reduce reliance upon the under steel frame 50 also allows reduction in transportation cost, and costs associated with that sunken expense in the building unit 100.

With respect to the side walls 103, 104, the inventors suggest that each wall may be constructed based on a single framing structure for each running the entire length of the building unit 100. This also applies to the marriage wall 103, which in conventional practice is often constructed in framing sections. There is believed to be benefit in using the near-zero slip panel attachment techniques to both the marriage wall 103 and the exterior wall 104 (though there may be some reason to do this on only one, in some cases).

In better practice of the embodiments shown, all rails 116, 117, 118 and plates 120, 121 may be constructed using pieces of structural material of the longest available dimension. Doing so provides for the greatest lengths of uninterrupted structural or load-bearing fibers, and this results in structural elements having the greatest strength and stiffness. Traditionally, joints represent weak points and opportunities for slippage, thus such efforts made to eliminate joints are profitable. The ends of the top and bottom plates 120, 121 should be squared off, and they are held tightly together while they are joined. Square and tight ends will help to reduce joint slippage while under a compressive load.

Without limiting the scope of the invention, the shown embodiments use plywood panels 114 for roof 105 decks, floor 106 decks and sheathing for the side walls 103, 104 rather than OSB since plywood has longer continuous strands of wood fiber, though if desired OSB or other composites could be used. Use of plywood, however is believed to increase stiffness relative to a similar structure constructed using OSB. In addition, adhesive is used to fasten the sheathing panels of the floor 109, side walls 110, or roof decking 108, (and possibly the scabs, when the scabs face the skeletal structure of the studs) firmly to the perimeter floor band joist 116, ridge and eave rails 117, 118, the wall top and bottom rails 120, 121, any door or window headers (not shown) and the wall studs 111. The adhesive serves to unify these structures together in a near-zero slip joint.

The pattern to be used for the arrangement of sheathing panels 114 and the scab overlays 115 is also to be considered. As shown, the panels of sheathing 114 are applied with the long dimension aligned horizontally—with the length of the building unit. For example, a building unit 60 feet (18.3 m) in length would have 7½ sheets of plywood applied covering the bottom 4 feet (122 cm) of the exterior side wall 104 and the marriage wall 103. The second full row of sheathing 114 would be applied at the top of the side wall 104 and marriage wall 103. The top row, like the bottom row, would also have the long dimension of the sheets 114 aligned with the length of the building unit 100. The vertical joints of the top sheets would be offset in relation to the vertical joints in the bottom row. For example, if the bottom row began by using 7 full 8 foot sheets and ended with a half-sized (4 feet (122 cm) long) sheet, the top row would start with a 4 foot sheet then would have 7 full sized sheets. Thus the joints in the top and bottom rows would be offset by 4 feet (122 cm). The vertical gap existing in the exterior wall 104 that remains to be sheathed after application of the top and bottom rows of sheathing 114 will typically be between 16 inches (40.6 cm) and 24 inches (60.1 cm). This gap may be filled with a row of sheathing 114 whose vertical end joints are staggered so as not to align with the gaps in either the top or bottom sheathing rows.

Assuming the marriage wall 103 is 14 feet (4.3 m) tall (15 foot (4.6 m) road limit −1 foot road clearance), application of a top and bottom row of sheathing 114 (with its longest dimension horizontally oriented, as discussed above) cover 8 vertical feet (244 cm) of the marriage wall 103. This leaves a vertical gap of 6 feet (183 cm) that remains to be sheathed. This gap may be filled using several alternative approaches. Plywood sheets 114 may be applied vertically so they are 6 feet (183 cm) tall and 4 feet (122 cm) wide, or 2 rows of sheathing 114 that are 8 feet (244 cm) long may be applied. If this latter approach is used, the two rows can either be 3 feet (91 cm) high each, or one row can be 2 feet (61 cm) high and the other row can be 4 feet (122 cm) high (or, other variations could be used, if appropriate to best utilize the scrap generated from other processes or for other reasons).

The conventional site-built and manufactured or modular buildings typically have header beams above doors and window openings in load bearing walls 101, 102, 103, 104. In appropriate circumstances in embodiments of the invention these beams could be eliminated. The sheathing 114 integrates the wall top plate with the eave rail 117 or ridge rail 118 and the lumber used to form the rough frame of the opening to act as a beam structure, and this provides support greater than or equal to the headers that are replaced. Thus the cost of header material, fabrication and installation can be avoided.

After both the exterior side wall 104 and the marriage wall 103 are sheathed, the joints between adjoining sheets of plywood 114 would be unified with scab overlays 115 as discussed above. While a layer of scabs 115 is shown, it is possible, though not necessarily economical, to apply a full second layer (instead of the second layer being only scabs 115) of sheathing panels 114. The width of the scab overlay 115 used may vary depending on such factors as the builder may wish to consider, but the 16 inch (40.6 cm) wide scabs 115 will be used for example. This 16 inch (40.6 cm) wide dimension provides for 8 (20.3 cm) inches of contact between the scab 115 and each of the full sized panels of sheathing 114 to be joined (if the panels abut one another, though it is understood that the panels may not directly abut, but may be separated by a gap). The scab 115 is attached by applying adhesive to the scab 115, placing it into position, then possibly nailing or otherwise securing it to the sheathing 114 until the adhesive cures sufficiently. The long joints that run the length of the building unit 100 are covered first. The vertical end joints of the scabs 115 are positioned so as not to align with the vertical joints in the sheathing panels 114. After the long horizontal joints are completed, the vertical joints are then assembled. It is contemplated that in some instances it may be desirable to scab only the horizontally oriented joints, while in others only the vertically oriented joints may be scabbed. Of course, scabbing all or the majority of all joints is likely to be preferable.

At the top of the marriage and exterior side walls 103, 104, the top of the sheathing 114 is flush with the top of the eave rail 117, ridge rail 118, and roof trusses 113 such that when the roof decking 108 is put on, the rails 117, 118 and roof trusses 113 will be touching the underside of the roof decking 108. Ridge rails 118 and eave rails 117 are connected to both the side wall sheathing 110 and the roof deck sheathing 108 by near-zero slip joints to unify the side wall assemblies 103, 104 to the roof 105 assembly.

If all of the floor assembly 106, side wall assemblies 103, 104 and roof deck assembly 105 are tied together as a single, integrated structure, the building 100 represents a box beam structure that has great stiffness and strength in both bending and torsion along its length. Thus, a building unit 100 may be constructed that is stiffer, stronger and more resistant to damage during transport (in primary bending or in torsion) than current art while utilizing the same construction materials as under the current art. Coupled to the invention's ability to act as a beam structure is the ability for it to act as a torque tube that provides a very high degree of resistance to torsion There need not be significant differences between construction described herein and conventional practice regarding the ceiling, interior walls, sheetrock, etc. Ceiling and internal roof structure may be constructed in a manner similar to the process used in conventional construction. In fact, where desired, the teaching herein can be applied to economically produce a preconstructed building unit in a factory that can simultaneously, or with overlap in equipment used, produce manufactured homes and modular homes of more conventional construction In order to minimize the changes in the work processes between the embodiments of the present invention and other products, use of wood (typically southern yellow pine, fir, or spruce) is acceptable in embodiments of this invention as the primary structural material for the building, though composites may be used. If desired, the building unit 100 can be configured so that the labor force employs substantially the same materials, tools and skills as is required for construction of the conventional manufactured homes and modular homes and even site-built homes At the ceiling and roof rafter station in the factory, there need be no significant differences in the other processes between those used as shown herein and those used to make manufactured or modular buildings. These processes include installation of ceiling ductwork, electrical rough-in and finish work on sheetrock including texturing or final finish. After it is allowed to dry, the ceiling and roof assembly 105 is moved to be mated with the floor and wall assemblies 103, 104, 106. Once the ceiling and roof truss assembly 105 is placed on top of the wall top plates 120, fasteners like long screws or nails are used to attach the ceiling and roof assembly 105 to the wall top plates 120.

The side wall sheathing 110 should remain continuous and unbroken with the exception that windows and doors may be installed. Any large openings—especially along the marriage wall 103, may remain sheathed until after arrival on site. Thus the side wall structures 103, 104 will serve as elements of the integrated beam to carry the weight of the building 100 during transport and emplacement, and it will be removed and discarded after the building 100 is properly set on the foundation, anchored and supported.

Siding may be applied at the time and circumstances required by applicable rules, regulations, or ordinances. Advantageously, however, it is considered that the continuous sheathing, scabs and adhesive joints already by themselves form a continuous structure around the perimeter side walls 101, 102, 104 of the building, and therefore the need for "house wrap" is reduced. The air-infiltration house wrap that is typically applied to site-built, manufactured home, or modular home or modular building may be omitted, as the techniques and structure described herein may be used to reduce air infiltration without such measures A typical timeline of constructing a building unit 100 as described herein may delay the installation of plumbing and HVAC (heating, ventilation and air conditioning) ducting under the floor deck 109 until after emplacement on the final building site While not required for the building unit 100 described herein, the inventors have built upon the concept of the building unit 100 as a beam by providing a useful transportation system 150 that works in coordination with the building unit 100 to maximize transportability of the building unit 100. Given the stiffness that can be built into the building unit 100, it is not necessary to use an underframe 50 to support the building unit 100 during transport. It is also not necessary to have axles or wheel structures under or to the side of the building unit 100. In fact, the following discussion describes a transportation system 150 that places its wheels only in front of the building unit 100 and behind the building unit 100. Of course, wheels could be placed between, but they are not necessary in all cases.

Figure 9A:
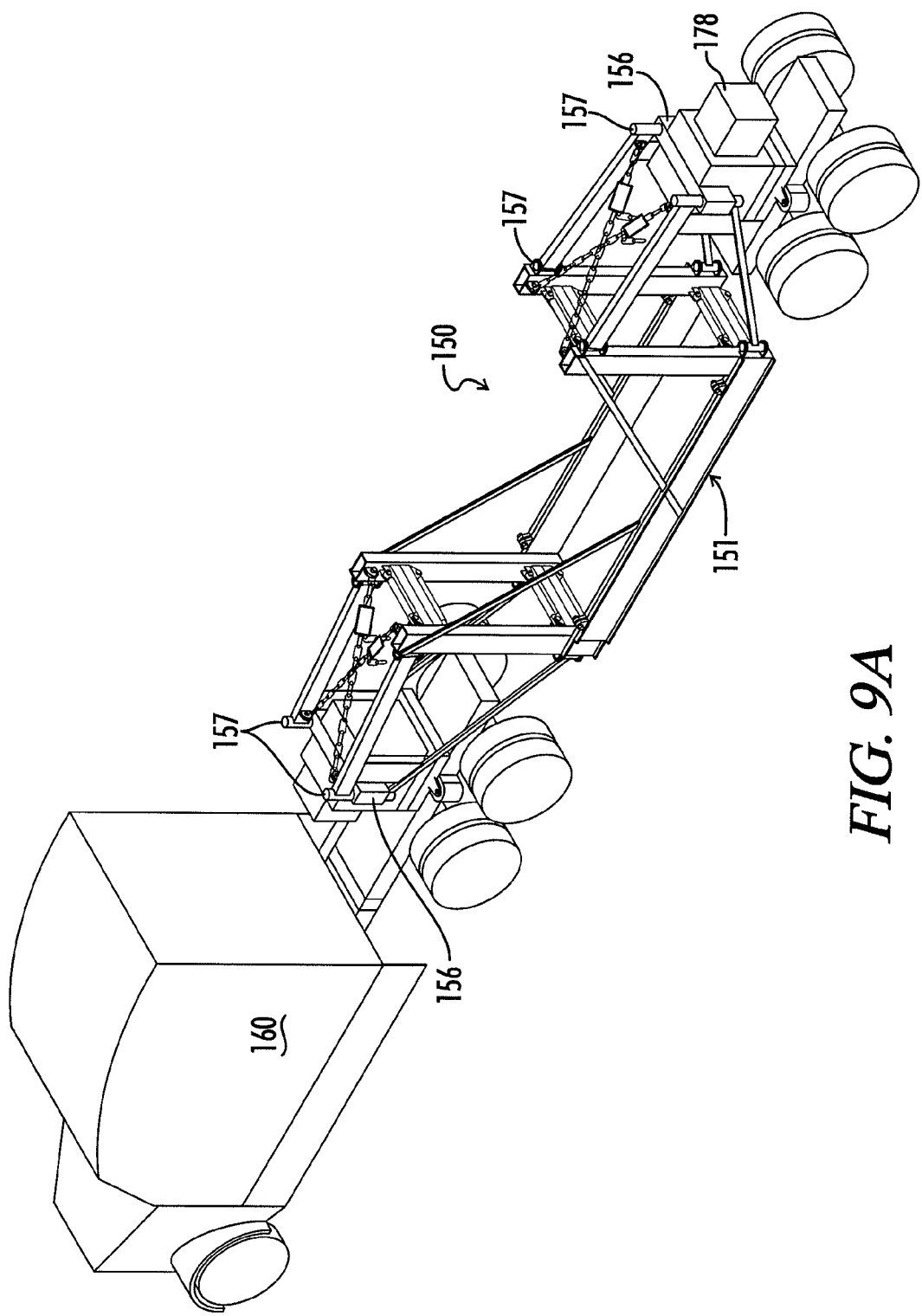
FIG. 9A shows an isometric view of an embodiment of the transport system 150 collapsed into position for the return trip to the factory or to another location. The lifting frame 151 configured as shown in the collapsed, narrow position will not require a wide load permit to travel on roadways.
Figure 9B:
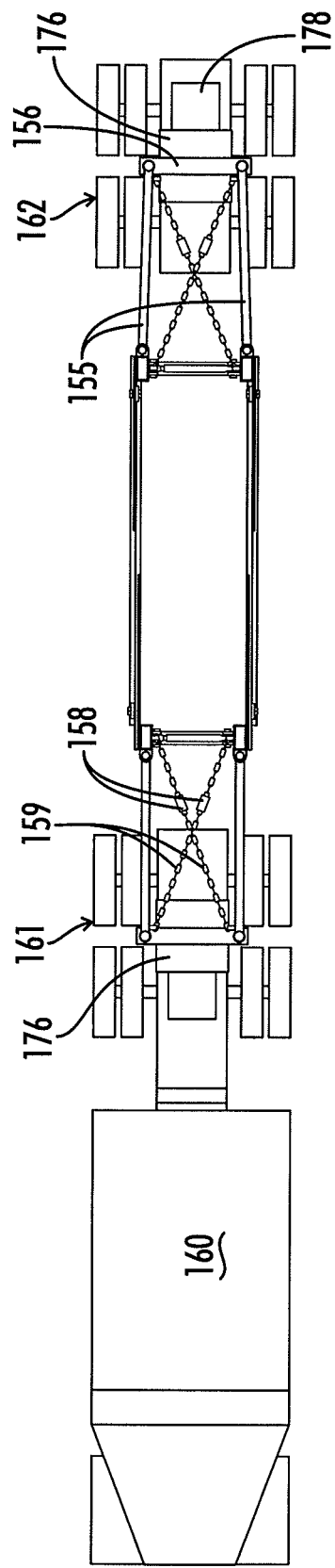
FIG. 9B shows the corresponding top view and FIG. 9C shows the corresponding side view. Some parts are omitted from these views for clarity.
Figure 9C:
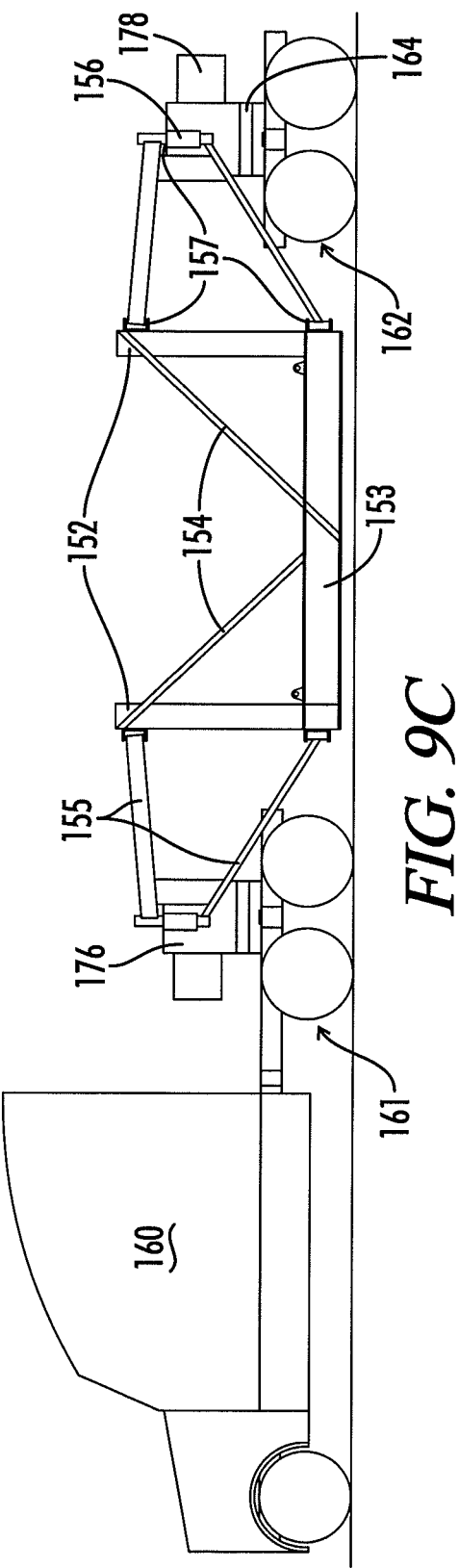

FIGS. 5A and 5B show an overall isometric view of an embodiment of the transport system 150 configured outbound from the factory to the building site carrying a building unit 100 as described above. FIG. 9A shows an isometric view of the transportation system 150 collapsed and configured for the return trip to the factory. FIGS. 9B and 9C show a top view and a side view of the same 150.

One embodiment of the transportation system 150 uses a lifting frame 151 structure at each end (front & back) to transmit all forces between the building unit 100 and the road wheels 161, 162.

Figure 5C:
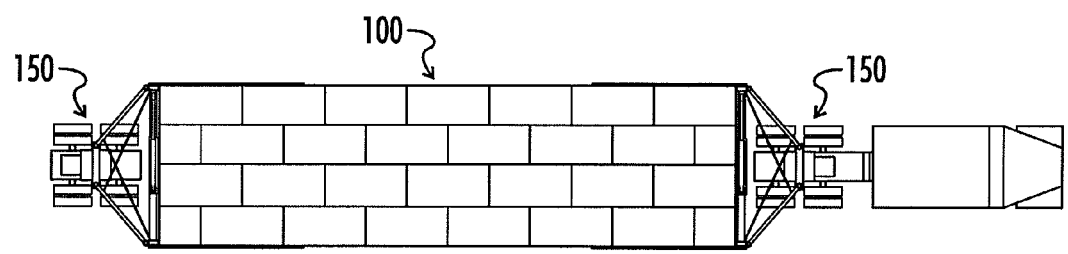
FIG. 5C shows a top view of a shown embodiment of the building unit 100, lifting frame 151, and transportation system 150.
Figure 5D:
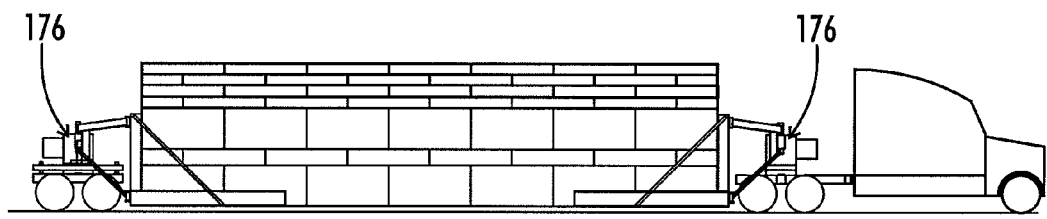
FIGS. 5D and 5E show side views of shown embodiments of the building unit 100, lifting frame 151, and transportation system 150.

The forces transmitted between the building unit 100 and the road wheels 161, 162 include the vertical lift force, the horizontal forces such as braking and lateral loadings, and the turning moment introduced by offset lifting. The term "offset lifting" is used here to describe the turning moment that is introduced when a load is lifted using a connecting structure where the lifting point is horizontally separated from the load. The value of this turning moment is equal to the load multiplied by the horizontal distance separating the lifting point from the load. In the shown embodiment 150, the lifting point is the cross beam 156. As seen in FIG. 5D and others, the load is transferred from the building unit 100 to the lifting frame near the middle of the floor band joist channel 153.

The transportation system 150 includes several general categories of assemblies or components including the building attachment structures 153, suspension connection structures, the elevation mechanisms 170, and the rear suspension dolly 162. Some or all of these may be directly attachable (even permanently) to trailer tractors 160 that serve as the prime movers.

Several elements that are included in the shown embodiment are common in the trucking industry. These include such elements as the trailer tractors 160, rear suspension 162 (commonly called the dual tandem bogie), actuators 171, 182 (such as hydraulic cylinders or jack screws), power units (not shown) to energize the actuators, controls (not shown) and connections (not shown) for lights, air brakes & turn signals.

A lifting frame 151 can be provided to allow the transport system 150 the capability of changing the height of the building unit 100 for loading and unloading, and possibly also for repositioning the road clearance during transport. Here, the term "lifting frame" 151 is used to refer to the structures that attach the building unit 100 to the elevation 170 and suspension systems 161, 162. The lifting frame 151 as shown generally is divided for discussion purposes into five major part types: attachment alms 153 vertical posts 152, diagonal braces 154, connecting arms 155, and cross beams 156. Two lifting frames 151 are required to lift a building unit 100—one in the front and one in the rear. Each side of a lifting frame 151 has an attachment arm 153, a vertical post 152, and a diagonal brace 154. Each lifting frame 151 also has one cross beam 156 and four connecting arms 155—an upper and a lower arm on each side.

Three of these parts on each side (the attachment arm 153, vertical post 152 and diagonal brace 154) are welded or otherwise affixed to each other so that they are unified and act as a single structure. One embodiment of the attachments arms 153 can be fabricated using steel channel sections, and the term "channel" or "channels" used in this patent application may be used to indicate one or more of the attachment arms 153. The lifting frame 151 is connected to the building unit 100 at the lower portion of the side walls 103, 104 by numerous lag bolts (not shown) that screw into the building unit's floor perimeter band joists 116 through holes in the attachment arms 153. The holes and lag bolts fit tightly together and the attachment arms 153 are sufficiently thick so that the lag bolts cannot rotate appreciably about any axis even after loading. As shown, the attachment arms 153 are fastened to the building unit 100 from the side. A lip (not shown) extending underneath the side wall assemblies 103, 104 and perimeter floor band joists 116 may be provided to add support to the building unit 100 from below, but is not considered strictly necessary, as the beam-like stiffness of the building unit means that support from underneath may be unnecessary. Where possible the inventors desire the primary attachment to be from the sides of the building 100, and the primary load path to be through these side points of attachment. So doing may have advantage for maneuvering and emplacement, as the building unit 100 would not need to be lifted off of the attachment arms 153 (or, restrained while the attachment arms 153 are slid out from underneath), but merely may be set down and detached, eliminating the need in some cases for cranes, jacks, restraints or lifts (apart from the lifting frame 151 that may be a part of the transportation system 150).

The fact that the building unit 100 is detachable from the transportation system 150 reduces transportation cost of the building 100, in that either (or both), the cost of the transportation system components are not "lost" or "sunken" into the building 100, and the transportation system 150 can be re-used. Because the building unit 100 allows the transportation system 150 to attach without an under frame 50 or wheels required underneath the building unit 100, there is no need to trade resiliency of the transportation system 150 against the demands of a low-profile carriage. This, in turn, means that the transportation system 150 can be well-engineered and costs spent on ride quality, because the costs will be spread over multiple trips, rather than one or a few trips. In turn, such a transportation system 150 reduces the post-delivery service cost (the cost to fix damage to the building 100 that occurred in transport) through the use of the high quality suspensions 161, 162 that reduce transportation shocks and vibrations. Further, because the transportation system 150 may be designed without a requirement to support the entire underside of the building unit 100, it can be reconfigurable to adopt an "outbound" profile in which the attachment arms 153 are extended to attach to the side walls 103, 104 of the building unit 100, and alternately to collapse into an "inbound" configuration in which the attachment arms 153 have been swung in or otherwise retracted to a total width of the transportation system 150 that allows the removal of the "wide load" permit necessity on the return trip to the factory because the lifting frame 151 "collapses" to a width that eliminates the need.

The building unit 100 together with the lifting frames 151 at each end act as a beam structure that spans the distance between the elevation or lift systems 170, which are centered atop the suspensions 161, 162. The lag bolts (not shown) that accomplish the connection between the building's floor band joists 116 and the attachment arms 153 transfers both lifting (vertical) forces and tensile (horizontal) forces from the lifting frame 151 to the structure in the lower portion of the building unit 100. (Here, "tensile" is used to describe forces acting along the length of the building unit 100.) The structures that carry these tensile forces include the perimeter band joists 116, wall bottom plates 121, the floor decking 109 and the sheathing 110 in the lower part of the two side walls (structures lying below the neutral axis 90 shown in FIG. 4.

The vertical posts 152 transfer compressive forces to the structure in the upper portion of the building unit side walls 103, 104. The tops of the vertical posts 152 deliver this compressive force to the area near the marriage wall 103 and exterior wall 104 top plates 120, eave rail 117 and ridge rail 118. These compressive forces are distributed to the entire top portion of the building structure including the roof decking 108, wall top plates 120, eave rail 117 and ridge rail 118, and the upper portion of the wall sheathing 110 (structures lying above the neutral axis 90 in shown FIG. 4).

Closest to the building unit 100, the connecting arms 155 are attached to the vertical posts 152 at the top and the bottom with hinges 157 as can be seen in FIGS. 5A and 5B. The connecting arms 155 are connected to the cross beam 156 with one hinge 157 on each side arranged so that they rotate about the vertical axis. The connecting arms 155 on each side remain oriented with respect to the vertical as they rotate. These hinges 157 allow the lifting frames 151 to be moved from the wide position when carrying a building 100 to the closed position when returning to the factory.

The upper connecting arms 155 primarily carry a compressive load, and the structure selected for this component is a heavy wall box tube since this provides a high degree of resistance to column buckling. The lower connecting arms 155 primarily carry a tensile load, but it may occasionally experience a compressive load. For the same reasons listed above, a box tube section is used to fabricate this component.

FIG. 5D shows a side view of the overall lifting frame 151 as being an assembly that includes each of these parts. This figure shows a building unit 100 that is supported by two substantially identical lifting frames 151; one at the front and one at the rear. The front and back of each building unit 100 are attached to a lifting frame 151 on both the roadside and the curbside. As shown, the lifting frames 151 are substantially symmetrical in that the roadside and curbside are substantially mirror images of each other.

FIGS. 5A and 5B provide isometric views showing additional detail of the lifting frame 151. These perspectives show how the elevation mechanism 170 supports the cross beam 156 that connects the left and right sides of the lifting frames 151. These perspectives also show how the floor band joist channels 153 (otherwise referred to as attachment arms) and the diagonal braces 154 are the outermost parts and that these fit along the outside of the building unit 100. The vertical post 152 has its outer edge aligned with the outside of the building unit 100 so that its upper portion will contact and transmit a compressive force to the structure within the building unit 100. The connecting arms 155 have hinges 157 at the points of attachment with the vertical post 152 and the cross beam 156 that spans across the center of the elevation mechanism 170. FIGS. 5C and 9B provide top views that show the movement at these hinges 157 as the transport system 150 is converted from its loaded configuration as shown in FIG. 5C, in which it transports a building unit 100 from the factory to the building site, to its closed configuration as shown in FIG. 9B, in which it 150 contracts to a width that allows a return trip to the factory without requiring a wide-load permit.

The lifting point of the front lifting frame 150 must be located with sufficient horizontal clearance between the building unit 100 and the truck wheels 161 during sharp turns. In the shown embodiment there is provided at least 92 inches (234 cm) from the front end wall 101 of the building unit 100 when in the outbound configuration in order to provide for adequate clearance. There is no such consideration for the rear suspension 162 (unless pivoting of the rear suspension 162 is desired giving the system 150 a "rear steer" ability) (though if rear-steering is desired, there could be), and the front wheel of the rear suspension 162 could conceivably be located immediately behind the building unit's rear end wall 102 with only a small space for clearance to ensure that the wheels can turn.

While other configurations may accomplish the same thing, FIGS. 5A, 5B, 5C, 9A, 9B and 10A shows two pairs of telescoping box beams 180, 181 that connect the tops and the bottoms of the vertical posts 152. The telescoping stabilizer beams 180, 181 consist of and upper and a lower set of telescoping box beams 180, 181. There are a total of eight box beams 180, 181 per lifting frame 151 as shown. One box beam set 180, 181 is located near the top of each lifting frame 151 while the other set 180, 181 is located near the bottom.

Each box beam set 180, 181 consists of four box beams—two inner 180 and two outer beams 181. Two outer box beams 181 are welded or otherwise affixed to each other 181 to form the center of each set beams. The inner box 180 beams are placed inside each of these outer beams 181. One 180 is welded or otherwise affixed to the left vertical post 152 while the other 180 is welded or affixed to the right vertical post 152. The inner box beams 180 are sized so they form a sufficiently tight fit inside the outer box beams 181 that there is very little slop or slack in between the inner 180 and outer 181 box beams. All of these box beams (both the inner 180 and the outer 181) are approximately seven feet (213 cm) long. This allows for the inner 180 and outer 181 box beams to be completely nested while collapsed thus ensuring that a wide load permit is not required. Also it allows for both the left and the right sides to be extended approximately halfway while connected to the building unit 100. This provides an ample amount of stability to the lifting frames 151.

When the lifting frame 151 is used to lift a building 100, the upper members of the structures (both the building 100 and the transport system 150) are subjected to compression. The compressive force in the upper connecting arms 155 exerts an outward-acting force at the tops of the vertical posts 152. This spreading force is caused by the connecting arms 155 being oriented such that they are wider at the vertical posts 152 than they are where they 155 connect to the cross beam 156. This force that pushes the tops of the vertical posts 152 apart can be countered by fitting the upper pair of telescoping frame stabilizer box beams 180, 181 with suitable paired holes and pins (not shown) or other means of constraining the telescoping movement. The spreading force caused by compression in the upper connecting arms 155 may alternatively be countered by a heavy chain (not shown) that connects the tops of the vertical posts 152. Actuators 182 such as hydraulic cylinders, pneumatic cylinders or jack screws may be used to assist with expanding and contracting the lifting frames 152.

When viewed from above as in FIGS. 5C and 9B, the lifting frames 151 have four hinge points 157 at the ends of the connecting arms 155. To counteract any sideways force on the building unit 100 that translates into a force that tends to rotate the suspensions 161, 162, structures 159 can be added that connect the hinge points 157 to the hinge 157 that is located diagonally across the lifting frame 151. These structures 159 restrict the movement or rotation of the connecting arms 155. An embodiment of the lifting frame 151 employ heavy duty chains as these diagonal structures 159 while another embodiment may employ a rigid structure that can withstand both a compressive and tensile load. These "cross chain stabilizers" are not shown in FIG. 5A or 5B, but they may be seen in FIGS. 5C and 9A. Ratchet binders 158 common to the trucking industry, shown in FIG. 9A, or other devices may be used to tighten the chains securely.

The directional stability of the rear suspension dolly 162 can potentially be improved by the addition of a steering draw bar (not shown). This is a structure that connects the rear suspension 162 to the building 100, the lifting frame 151 or perhaps both. The purpose for this structure is to help keep the suspension 162 correctly oriented with the building unit 100.

FIGS. 10A-D show details of how the elevation mechanism 170 provides the ability to lift the building unit 100 high above the normal carriage height for the purpose of providing clearance under the building unit 100 for rough roads, railroad tracks and uneven ground found at construction sites, as well as other obstacles. The elevation mechanism 170 consists of a number of hydraulic lift cylinders, screw jacks or equivalent lifting actuators 171. These are arranged using slide 172 and guide 173 structures that permit substantially only vertical translation of the slide structure 172. An arrangement of holes in the slide 172 and guide 173 structures allows for pins (not shown) to be inserted for the purpose of locking the elevation height in order to avoid forcing the hydraulics or other lifting actuators 171 to carry the weight of the building unit 100 during transport.

In the shown embodiment, these slide 172 and guide structures 173 consist of two large nested steel boxes that telescope upwards as the load is elevated. The bottom outer box guide structure 173 of the elevation mechanism is the suspension interface. In the front, this consists of a king pin (not shown) connection that mates with a tractor truck's fifth wheel (not shown), and the suspension support bed 164 that rests on the fifth wheel. This provides for the standard connection (common in the trucking industry) between a tractor trailer's fifth wheel and the load being carried. In the rear, this suspension interface is simply that the bottom outer box guide structure 173 is welded or otherwise affixed to the tops of the rear suspension's 162 beams or support rails. The top inner box 172 of the elevation mechanism consists of the structure that connects the lifting cylinders 171 to the cross beams 156 and connecting arms 155. In the shown embodiment, the lifting actuators 171 are hydraulic cylinders that are powered by standard, off-the-shelf, gasoline-driven hydraulic pumps 178 common in the trucking and hydraulics industries. These power units 178 are shown in FIGS. 5A-D and FIGS. 9A-C as a featureless box attached to the outer guide structure 173. Standard hydraulic hoses and valves (not shown) are used to connect the pumps to the cylinders and to control the units. The elevation mechanisms 170 transfer the lifting forces, some or all horizontal forces, and some or all twisting moments from the building unit 100 to the suspensions 161, 162.

If rear steering is a desired feature for the transport system 150, the suspension interface between the rear outer guide structure 173 and the rear dolly suspension 162 may be accomplished by adding a fifth wheel (not shown) to the top of the rear suspension 162. The bottom of the rear guide structure 173 would be fitted with a suspension support bed 164 and a king pin. Actuators such as hydraulic cylinders could be used to provide the forces necessary to rotate the rear suspension 162 as desired. Pins or other locking devices should be used to secure the rear suspension's 162 rotation relative to the building unit 100. Also, it may prove useful to provide a pin or other locking device that controls rotation of the rear suspension's 162 fifth wheel.

The cross beam 156 on the discussed embodiment shown in FIGS. 5A-D and FIGS. 9A-C is located a considerable distance above the ground. Turning moments are introduced to the cross beam 156 and elevation structure 170 as horizontal forces (primarily thrust and braking loads) are transmitted from the road wheels 161, 162 to the building unit 100. The stresses induced by these loads may be significantly reduced by the addition of some optional thrust structures (not shown). In the front, the thrust structure redirects the horizontal loads from the building 100 into lateral beam structures (not shown) that connect the vertical posts 152. Then the loads are routed from the middle of the lateral beams into a pair of box beams or tube members (not shown) that are attached to points at the bottom of the front elevation box guide structure 173. In the rear, the thrust structure (not shown) redirects the horizontal loads from the floor decking 106 into a pair of angle iron pieces (not shown) that sandwich the end wall 102 band joists 116. A pair of box beams or tube members (not shown) connects to points on the outer angle iron, and these deliver the load to connection points (not shown) affixed to the rear dolly suspension 162. The connections at each end of the box beams are accomplished using pins or bolts (not shown) oriented horizontally. This allows these joints to flex and the building unit 100 can be elevated to some extent without disconnecting the thrust structures.

The transportation system 150 includes several devices and features which enable the unit 150 to be disconnected from the building unit 100 after delivery and configured for the return trip to the factory. Temporary on-site wheels (not shown) are fastened to the sides of the attachment arms 153 to provide them with greater ease of mobility so they can be pulled away from the building 100, positioned to attach the front lifting frame 151 to the back lifting frame 151, and collapsed to the narrow configuration. The front and rear attachment arms 153 are secured to each other using heavy bolts (not shown) for transport in the absence of a building unit 100. Various boxes and fittings (not shown) provide to secure and store the various pieces of the thrust structures (not shown) that are removed after the building 100 is delivered.

The structural rigidity of the building unit 100 allows the unit to "dropped" or "off loaded" directly on the permanent foundation or near the permanent foundation for temporary storage with minimal structural support under the unit 100. A building unit 100 can be constructed as described herein that can be dropped on supports as minimal as 4 inch by 4 inch (10.2 cm by 10.2 cm) wooden posts stationed underneath the four corners of the structure 100. This allows the truck 160 and transportation system 150 to be removed from the site prior to the arrival of any crane unit that may be desired to emplace the building unit 100 on its permanent foundation. The inventors recognize that such a "drop and go" process associated with the invention allows short cycle times for the transportation system 150 and separately for crane and building unit set crews thereby reducing cost. Because of their inherent lack of structural rigidity, conventional habitable buildings such as manufactured homes, modular homes and modular buildings constructed with wood or composite floors must remain with their transportation frames until a crane can lift them from the transportation frame and emplace the home or building on the permanent foundation.

If desired, the transportation system 150 can be constructed to accommodate several possible modes of operation. These include: on-road, high-speed transport from factory to the building site, on-road, low-speed transport with the building unit 100 elevated to provide bottom clearance for some road obstacle such as railroad tracks, steering at the building site that is low-speed and may require the building unit 100 to be elevated, detaching the lifting frames 151, moving them away from the building unit 100, collapsing them for transport, securing the front lifting frame 151 to the rear lifting frame 151 for the return trip to the factory, and on-road, high-speed transport on return trip to factory with lifting frames 151 collapsed to a width less than the 8.5 foot width that would require a wide-load permit.

Moving back to the building unit 100 structure and construction, additional considerations may be addressed that arise in connection with transportation issues. If door and window openings (not shown) have not been left open during transport (it being possible to have the side wall sheathing 110 overlay the proposed areas for such openings during construction of the side walls 103, 104), after setting the building 100 on the foundation, the side wall sheathing material 110 that may have been used over such openings to strengthen the structure during transport and emplacement may be cut out and removed. In other words, installation of the doors, windows and other things that requires openings to be cut into the side walls 103, 104 may be delayed until after delivery to the building site (and perhaps emplacement on the foundation). Alternately, if doors, windows, or other openings are desired to be emplaced in side walls 103, 104, it is possible that during transport such cutouts could be considered points of weakness. The square corners of these cutouts would be the points of highest stress concentration. It is possible to relieve such stress concentrations by using a material overlay. A layer of material is firmly affixed over the area of stress concentration, and the stresses are reduced because load is carried by more total material. The material attached as a "doubler" may be the same as the parent material (plywood in the case of side wall sheathing 114—in one embodiment). The doubler material may also be a higher strength material such as a plate of steel or similar.

Another embodiment that may be employed is to use a temporary plug or filler in the cutouts such as doors and windows. Such a plug would fill the cutout opening very tightly, and could be made very stiff and strong. Thus it would resist any compressive forces or shear deformations. This device may add strength to the structure and serve to protect windows and doors from damage as a result of deformation.

Although the pine species of wood may be the material used for most of the primary structure in the invention, the strength and stiffness of the building 100 may be enhanced by substituting other materials for the pine. Also other materials may be added in addition to the pine or other wood structures. Oak and maple are but two of the many candidate materials that can easily be substituted for pine in selected members such as the ridge 118 and eave 117 rails that are subjected to high compression loadings. These and other materials show promise as candidates to be used for structures placed primarily in tension.

An example of a material that can be added in addition, to the members discussed above, is fiberglass. Long strands of fiberglass oriented along the length of the building unit 100 could be sandwiched in between the two layers of floor decking 114 in the shown embodiment that constructs the floor 106 using two full layers of floor decking 114. The adhesive that bonds these two flooring layers together, if placed on both sides of the fiberglass, would unify the fiberglass as part of that structure 109. The fiberglass would add its superior strength and stiffness to resist tension to the floor deck 109, and this would result in better resistance to bending when acting with the integrated building structure 100.

Another approach that can be taken to augment or replace the structure that resists bending is a system of king posts and wires (not shown). Just as a truss or bridge can employ king posts and wires, so can this building structure 100. The king posts and wires could be built as part of the walls 103, 104. The wires could be hidden in the walls and remain as part of the permanent structure. Some arrangements of doors and windows (not shown) might require that the wires (or even the king posts) might be located where an opening such as a window or door will be located once transport is complete for the building 100. In this case, the wires can be removed at the point where they emerge from the walls, and these terminations can be hidden by trim.

Another approach to increasing stiffness is through the use of a "strong-back endoskeleton". This could be thought of as a very strong and rigid wall-like temporary structure (not shown) that is attached to the unfinished interior floor 109 of the building 100 prior to transport. The field floor joists 112 or the perimeter joist rails 116 may be supported or hung from this strong-back endoskeleton by straps or wires that penetrate the unfinished floor 109 along its length. Theses straps might run from underneath the floor joists 112, 116 to the top of the strong-back. Thus, any deflection in the floor joists 112, 116 would transfer load to the strong-back. This in turn would cause the strong-back to distribute the load to all the floor joists 112, 116 that it crosses.

The top 120 and bottom 121 plates of the exterior 104 or marriage 103 side walls may be modified to provide the overall beam structure of the invention an additional measure of resistance to bending. If desired, a second, third or additional layers of top 120 and bottom 121 plates can be constructed in these walls. These plates may be constructed in a manner similar to that used to fabricate the perimeter joist rails 116. The board joints are to be staggered. Also, these boards may be adhesived together with a suitable adhesive in addition to any nails or other fasteners used in the current art manufactured or modular building construction.

In the instance where the builder desires that the exterior surface of the side walls 103, 104 and sheathing 110 be smooth (as for application of siding), the scabs 115 and other reinforcements that are applied over the joints between first sheathing layer panels 114 can be hidden on the inside of the sheathing 110 by placing the scabs 115 into a dado relief cut into the wall studs 111. The dado reliefs would be made by cutting material away from the side wall studs 111 where the scabs 115 are to be located. The depth of the dado cuts will be so that the scabs 115 fit snug in the cutouts and flush with the side wall studs 111. Other than the scab 115 being located on the inside rather than the outside of the sheathing 110, no other significant detail of the side wall 103, 104 scab construction is affected.

Alternatively, smooth exterior side walls 110 may also be obtained by employing the same technique as is discussed above in connection with the roof deck system 108. Instead of using full-sized 8 foot long pieces, scab pieces 115 cut to fit between the wall studs 111 may be used. Other than the scabs 115 being located inside the sheathing 110 and the scabs 115 being smaller pieces rather than full length, no other significant detail of the side wall 103, 104 scab construction is affected.

If desired, where the interior walls (not shown) of a structure 100 are situated such that walls that have few penetrations (doors or other openings, not shown) are aligned across the seam between two or more building units, these walls may be treated as "partition shear walls" rather than the standard interior wall consisting of studs 111 and wall board (gypsum board or similar). The partition shear wall has at least one side covered with a ply material such as OSB or plywood. Located directly above these walls are "shear roof trusses". The shear partition walls are connected to the shear trusses thru the ceiling by lag bolts or similar fastener. These shear trusses provide the ability to pull out any vertical sag in the floor 106 and perimeter floor band joist 116 near the marriage wall 103, and they provide the ability (in the case of multi-story buildings) to carry the vertical load of any floors lying beneath.

The inventors envision that these principles, devices, techniques and methods can be combined and employed to accomplish support for the marriage wall 103 perimeter band joist rail 116 by transferring these loads to the exterior wall 104 foundation supports (specific to multi-section buildings that have a marriage wall 103). The purpose is to support the marriage wall 103 joist rail 116 using the trusses 113 located in the attic space rather than posts or pier supports (not shown) used in more conventional construction. Doing so has the advantage that the central pier foundation supports that are commonly used in all types of traditional construction for habitable buildings may be eliminated. This provides the consumer with a clear first floor or basement space uninterrupted by posts or other pier foundation supports. The inventors use the term "free-span basement" to describe the area created when such a system is employed on building units 100 set on a basement foundation where the exterior foundation walls have been sufficiently reinforced to carry the marriage wall load in addition to the traditional exterior wall load.

The "marriage wall joist rail support system" consists of a plurality of truss halves arranged in pairs aligned across the marriage wall, truss bottom chord tension devices (not shown), and vertical support structures that transfer stresses from the marriage wall 103 floor band joist rails 116 to the trusses 113. Theoretically, approximately half of the entire floor loading is transferred vertically upwards from the marriage wall 103 floor band joists 116 to the attic trusses 113 at the marriage wall 103 seam. The loading is then transferred through the trusses 113 to the exterior side walls 104 where the load is routed vertically downwards into the building's foundation supports. Exerting a downward force on the trusses 113 at the marriage wall 103 tends to push the bottom of the trusses 113 apart. The truss 113 bottoms of each truss 113 pair (paired across the marriage wall 103) need to be held tightly together, and this may be accomplished using hold down straps (commonly used in the construction industry to anchor building structures to a foundation, among other uses) or devices that have sufficient strength.

In the free-span basement embodiment described in the paragraphs above, almost every roof truss should be joined with its mirror image truss on the other half of the building unit. This is undesirable in that it requires many connections to be made while joining the building units together during setup. The typical roof assembly 105 has trusses 113 located every 16 inches (40.6 cm) or 24 inches (61 cm), and a building unit 100 that is 60 feet (18.3 m) in length will have 44 such pairs of trusses 113 that are not part of the end walls 101, 102. Furthermore, there may be limitations on the size of door and other openings (not shown) that join the sections of the building 100 because stresses will be concentrated on each side of such openings. Floor plans common for building frequently have large openings across the marriage wall 103 seam that join two or more rooms. It is common to have a fourteen foot opening in the marriage wall 103 where a building plan has a den area joined to a living room or dining room. If desired, the marriage wall 103 floor band joist 116 support can be accomplished by providing a relatively smaller number of very strong girder trusses (not shown) in the attic space. These girder trusses could be built up from combining a multitude of (ideally not more than three) trusses 113 that are used elsewhere in the roof. These trusses could be spaced approximately ten (10) feet (305 cm) apart so that a sixty foot long building 100 would require only around five pairs of such girder trusses. There is economic benefit in combining several "normal" trusses 113 to form a girder truss, because this approach minimizes the need to have special parts which tax a factory's inventory system. The use of girder trusses requires corresponding reinforcement of the associated structures that hold the girder truss bottoms together, the vertical supports that deliver load from the floor band joists 116 to the girder trusses, and the exterior walls 104 and foundations that carry the vertical load once it is routed to the exterior walls 104.

The embodiment of the transportation system 150 shown in FIGS. 5A-D and FIG. 9A-C may be modified to eliminate the connecting arm hinges 157 and to have a telescoping cross beam 156. This change could eliminate the cross chain stabilizers 159 and binders 158 although it requires strong and rigid connections where the connecting arms 155 are fastened at each end—both to the lifting frames 151 and to the cross beams 156.

Figure 5E:
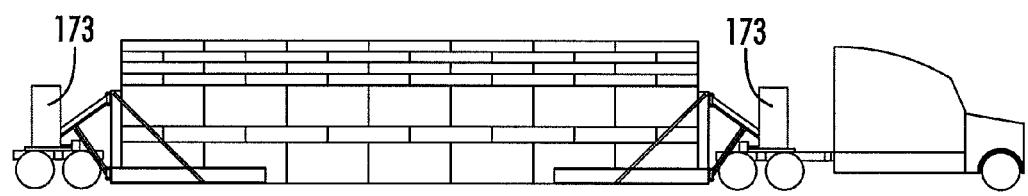
Figure 10A:
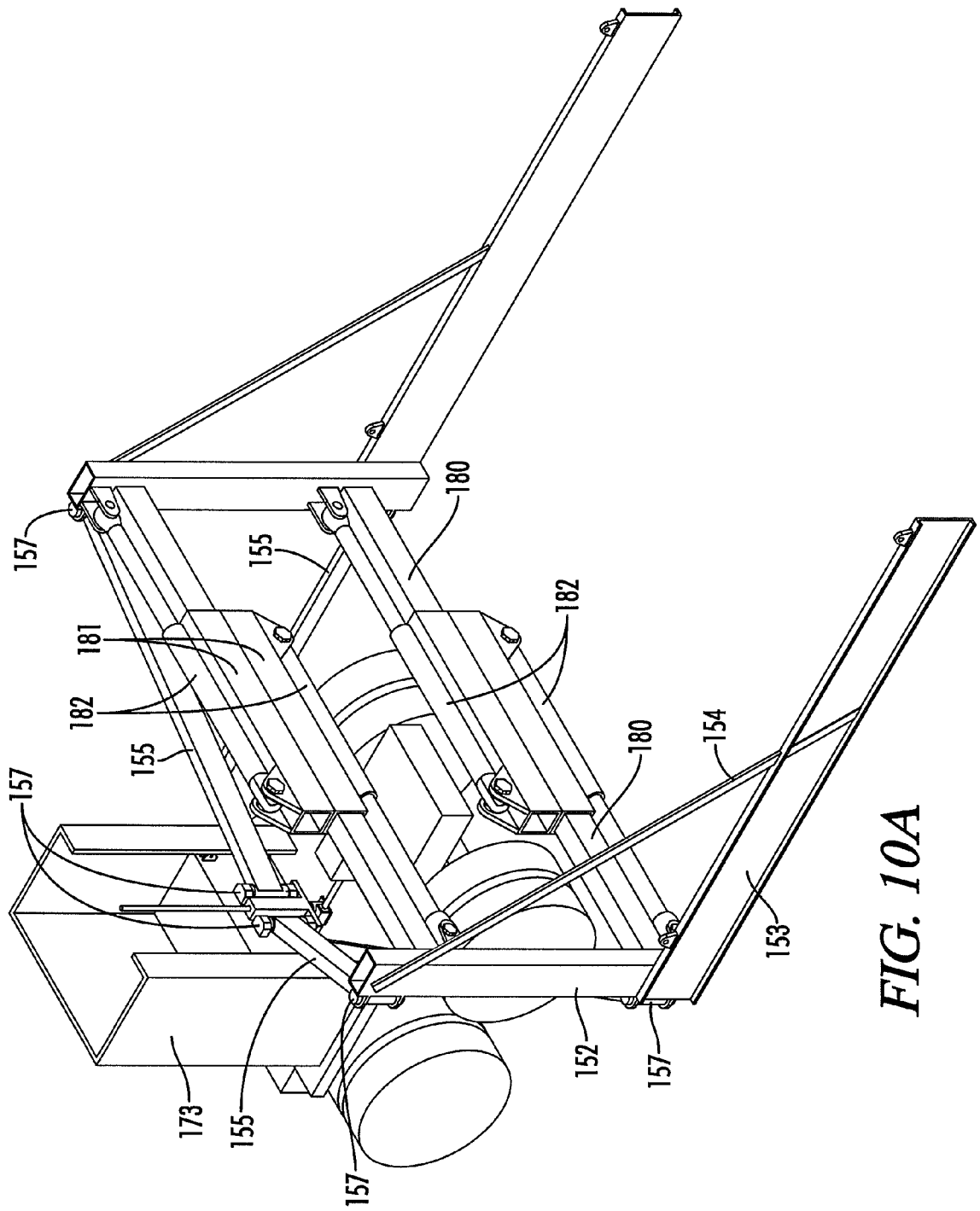
FIG. 10A shows greater detail about a shown alternative embodiment of the lifting frame 151 and elevation system 170. The lifting frame 151 is shown in an expanded configuration for that embodiment. The suspension is shown idealized—it could alternatively be considered the front suspension 161 (with portions of the tractor truck 160 not shown) or it could be considered the rear suspension 162 (with brake lights, etc, not shown).

FIG. 5E shows an alternative embodiment carrying a building unit 100 in the outbound configuration from the factory. FIG. 10A provides additional detail. Among other possible variations, the cross beam 156 is eliminated, and the pivot points 157 for the connecting arms 155 are brought very close to each other (when viewed from above). This change eliminates the need for the cross chains 159 and binders 158 of other embodiments. Having both connecting arms converge to near a common pivot point means that this embodiment uses a steering draw bar (not shown) to orient the rear suspension 162 with the building unit 100 being carried on the outbound leg. The transportation unit 150 will need to have the rotation or orientation of the rear suspension 162 constrained while the lifting frames 151 are collapsed on the return legs to the factory by connecting the steering draw bar to the outer stabilizing box beam 181 or alternatively to the connecting arms 155 located at some distance forward of the suspension 162. As another variation, the point at which the connecting arms 155 connect to the suspension structure 162 is located as low as possible. This requires that the lower connecting arm 155 be connected to the upper connecting arm 155 somewhere near mid-span, or that the lower connecting arm 155 should be bent in a fashion similar to a gooseneck commonly found on trailers. Lowering this connection point reduces the turning moment resulting from braking or accelerations acting at the points where the connecting arms 155 attach to the elevation mechanisms 170.

Figure 10D:
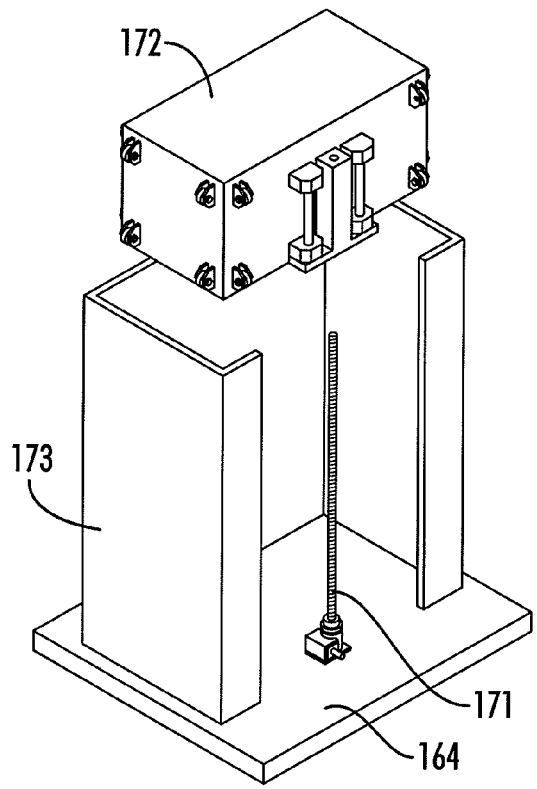
FIG. 10D shows a top view of FIG. 10B.
Figure 10D:
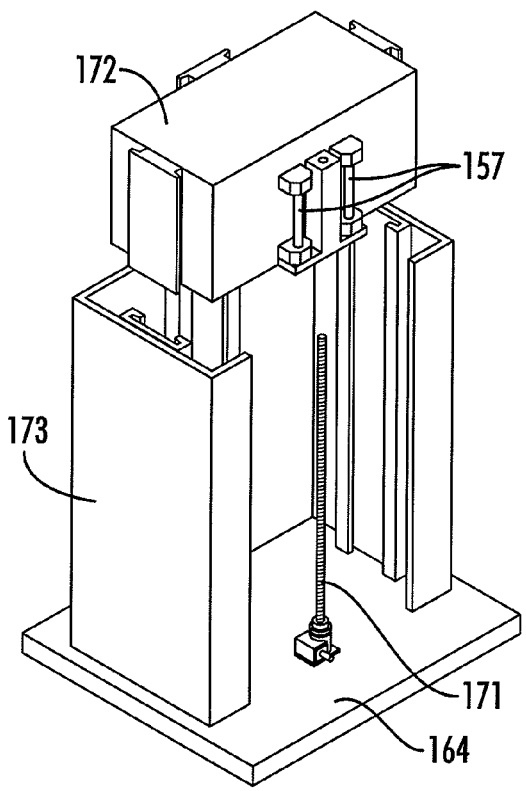
Figure 10D:
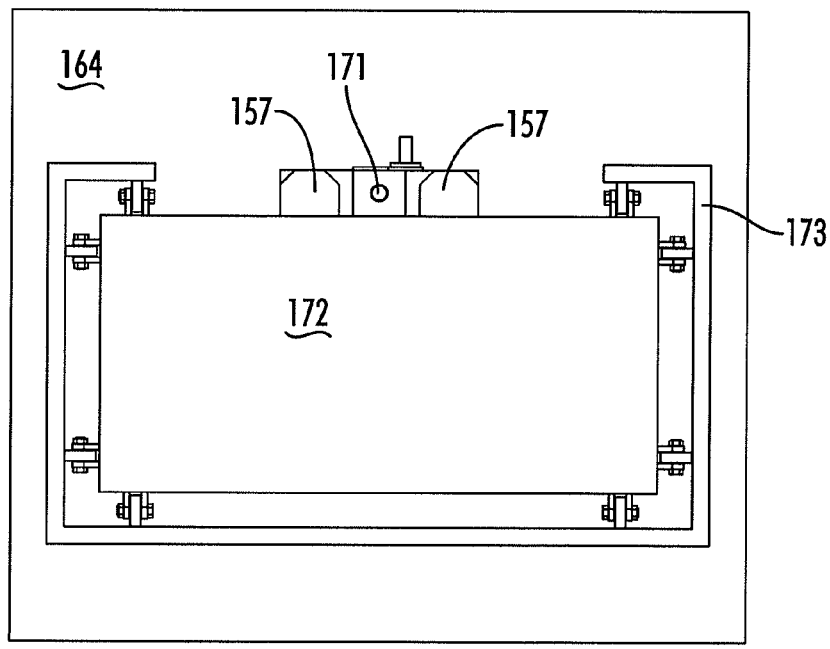

FIG. 5E and FIGS. 10A-D depict an alternative embodiment of the elevation system 170. FIGS. 10B and 10D show the slide 172 fitted with roller wheels. FIG. 10C shows how a slide channel could be used instead of wheels to accomplish the same function of restricting movement in all directions except vertical translation. A screw jack is depicted as the lifting actuator 171 in FIG. 10A-C. A motor or other suitable power source provides the energy required to operate the screw jack 171. Note that the power source, motor and other required components such as the cables and controls are not shown in these views. The suspension shown in FIG. 10A could either be the rear dolly wheel suspension 162 or it could be the drive wheels of a tractor truck 161. Note how the upper connecting arms 155 are straight while the lower connecting arms 155 connect to a point on the upper connecting arm 155 a short distance away from the elevation actuator 171. The upper connecting arm 155 experiences a bending load in addition to the column compression loading that is found in the previously described embodiment. Thus this member 155 should be sized appropriately to handle the combined loadings. It 155 will have a larger cross section and perhaps also greater wall thickness than the upper connecting arm 155 found in the embodiment discussed above.

In addition to the embodiment discussed above, additional variations of the transportation system 150 may be employed. The embodiments shown in FIGS. 5A-E, 9A-C and 10A show the use of a single building attachment structure 153 to transmit all forces between the building 100 and the road wheels 161, 162. These forces include the vertical lift force, the horizontal forces such as braking and lateral loadings, and the turning moment introduced by offset lifting. Alternately, separate structures may be used to transmit the vertical lift, horizontal and turning forces between the building unit 100 and the road wheels 161, 162. One structure can provide the lift force, and a separate structure can transmit the horizontal forces and resist the turning moment introduced with offset lifting.

Figure 12:
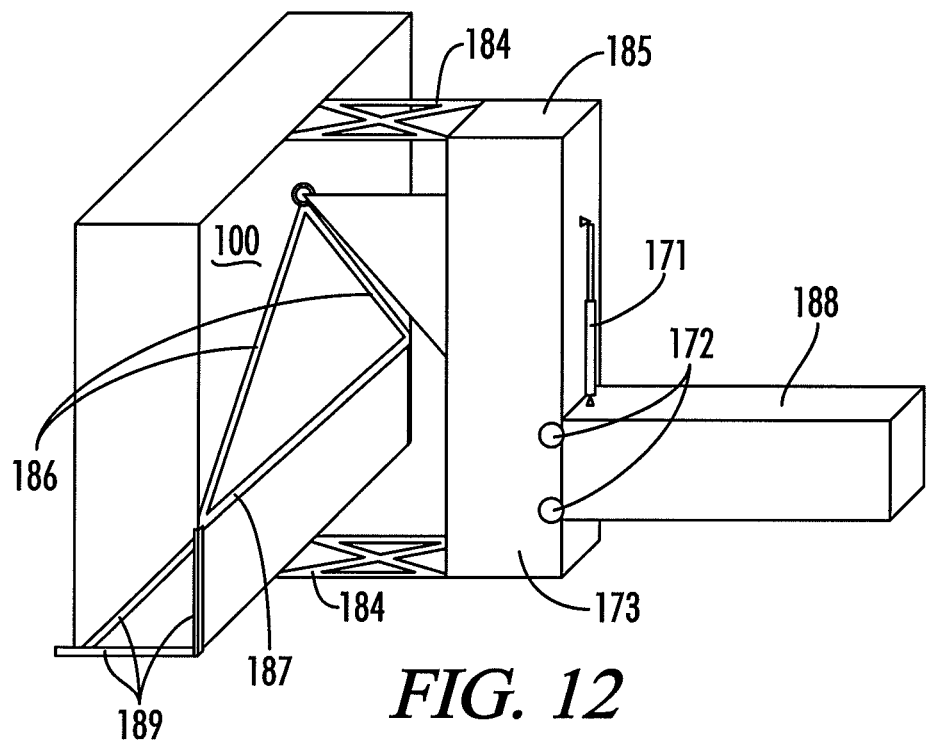
FIGS. 12 and 13 show additional embodiments of the transport system that use a mast tower 185 and a collection of lifting structures 186, 187, 189, 153, 198 to separate the load paths for forces acting horizontally and vertically.
Figure 13:
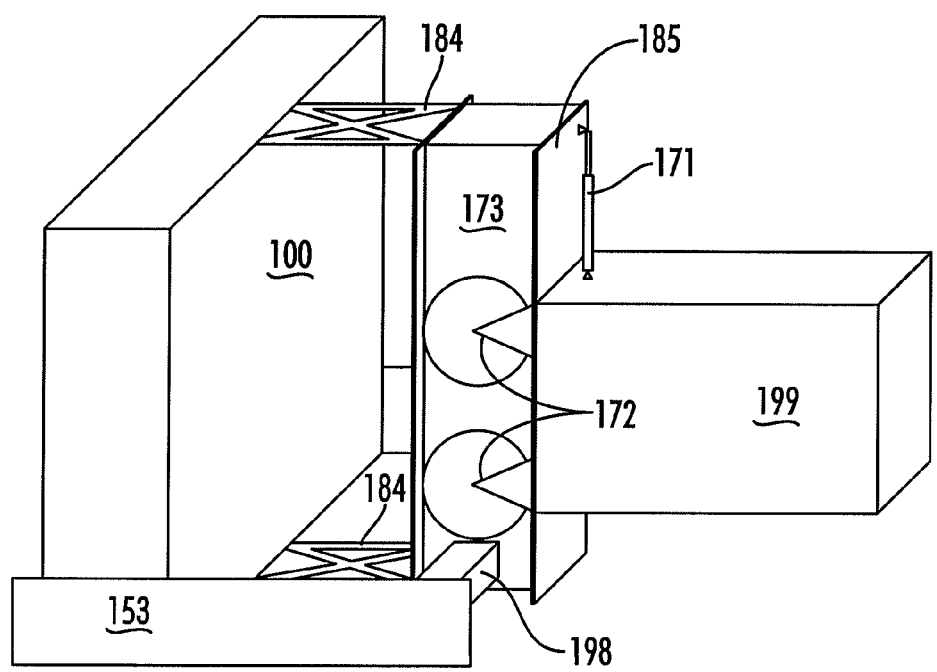

The alternative transport system embodiments shown in FIGS. 12 and 13 are distinguished by the strategy of employing two structures to deliver the three primary forces (vertical, horizontal and turning moment) to the suspensions 161, 162. The weight of the building unit 100 while elevated in transit is carried by structures 153, 189 that attach to the floor perimeter joist rails 116 and sidewall structure 110 at the sides of the building 100 near the end walls 101, 102. The structures 153, 189 that carry this load have very limited, if any, ability to transmit horizontal forces to the building 100.

The horizontal forces and the forces resulting from the offset lifting moment are transmitted to the building 100 via a central mast structure 185 in combination with thrust structures (not shown) that connect the tops and bottoms of the masts 185 to reinforced structures (not shown) embedded within the building's roof deck structure 105 and floor deck structure 106. The embedded reinforcements distribute the forces over a sufficiently large area that localized stress concentrations are avoided. These masts 185 and thrust structures transmit the horizontal forces from the transport system 150 to the building 100, but they have limited ability to transmit any vertical forces to the building 100. However, the attachment points are sufficiently strong to withstand the weights of the masts 185 where they attach to the building 100.

Figure 11:
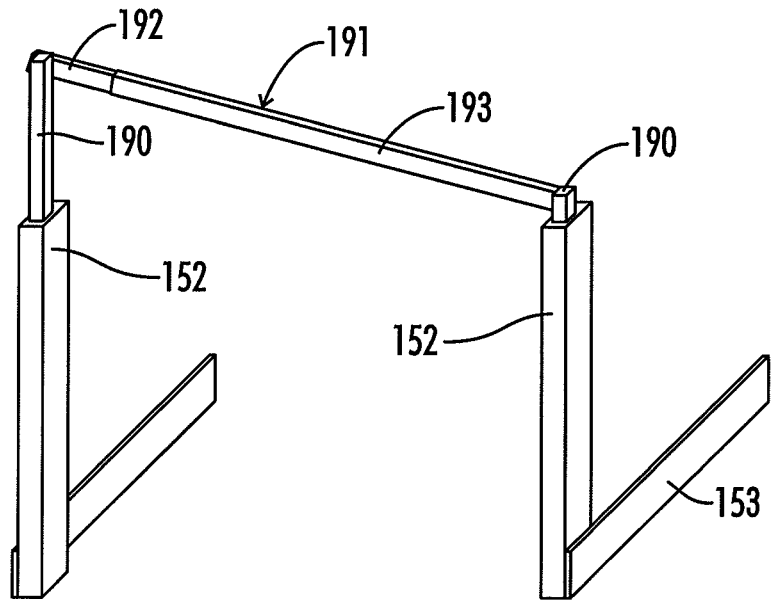
FIG. 11 shows a portion of an embodiment of the transportation system 150, specifically focusing on an idealized isometric view of a roof deck beam assembly 191 that may be positioned near the roof deck 105 in transport in which the sloped top beam 191 is telescopic and can be lengthened and shortened. The view also shows vertical post extensions 190 that are nested inside the vertical posts 152 and can be raised to any height desired.

FIG. 11 shows an isometric view of a transportation system 150 embodiment that includes an optional enhancement known as the roof deck beam assembly. (Many parts are not shown in FIG. 11 to provide clarity) This assembly is configured to transfer compressive force from the upper connecting arms 155 through the lifting frame 151 to the upper parts of the building unit 100 structure. The heights of vertical post extensions 190 are adjustable on each side for the purpose of correctly positioning the roof deck beam 191. The vertical posts 152 in the embodiment shown in all FIGS. 5, 9 and 10 are 6 inch×12 inch (15.2 cm×30.5 cm) rectangular box beams. The vertical post extensions 190 consist of box beam structures slightly smaller than the vertical posts 152. These are nested with the extensions 190 fitting inside the vertical posts 152 and are fitted with actuators (not shown) so that the extensions 190 can be raised as necessary and locked or pinned to match the height and slope of the roof deck structure 105. The connections between the tops of the vertical post extensions 190 and the ends of the roof deck beam 191 are substantially identical so that the ridge of the building unit 100 can be carried on either side of the transport system 150. The roof deck beam 191 consists of an I-beam 192 and a box beam 193 configured as a telescoping beam. The box beam 193 end fits snugly around the I-beam 192 end, and the box beam 193 is sufficiently long so that that ample overlap exists to keep the elements 192, 193 acting as an integrated, stiff, strong telescoping beam. This roof deck beam 191 is secured in alignment with the roof deck structure 105 by lag bolts that penetrate the I-beam 192 flange and screw into the fascia board or the exposed end of the roof deck structure 105. The ends of the roof deck beam 191 have fittings to secure it to the vertical post extensions 190.

A layer of material is inserted between the I-beam 192 and the fascia or roof deck structure 105 to serve as a spacer and compensate for the fact that the box beam 193 ends prevent the I-beam 192 from fitting snugly to the roof structure 105. If the ends of the roof deck 105 have soffits or similar overhangs, the attachment will be to the fascia boards and the soffits will be sufficiently reinforced so it can withstand the expected compressive loads. In other cases, the roof deck beam 191 will simply be bolted to the end of the building 100 aligned with the ends of the roof deck 105. These bolts only serve to align the roof beam 191 with the roof deck structure 105.

The transport system 150 may be closed for the return trip to the factory. The vertical post extension 190 and the roof deck beams 191 are removed and stowed or reoriented to lay on top of the building attachment structures 153.

The vertical post extension 190 is secured to the vertical post 152 while carrying a load. The hinge (not shown) on the inside of the vertical post 152 connects one side of flat plates (not shown) that are attached to the ends of the vertical post extension 192 and vertical post 152. The outside of these flat plates is connected with bolts. Following delivery of the building unit, these bolts are removed so that the vertical post extension 190 may be rotated to the closed position for the return trip.

Several options exist for a mechanism to reposition the roof deck beam 191 from the elevated position, as it is configured when attached to the building 100, to the lowered position which is the configuration used when the lifting frames are collapsed in the narrow configuration. One such mechanism is the roof deck beam elevator (not shown) which is a bar that is attached with a two axis hinge (not shown) near the bottom of the vertical post. The hinge allows the elevator bar to pivot about a vertical axis and the horizontal axis. This elevator bar has a pair of rollers (not shown) at the top end which roll on the roof deck beam's web surface. The flanges on each side keep these rollers properly located to support the roof deck beam. A winch (not shown) mounted as high as is easily assessable on the vertical post 152 is used to raise and lower the bar by means of a cable (not shown) that runs from the winch to the end of the elevator bar.

FIG. 12 shows an isometric view of one end of an alternate transport system 150 design configured outbound from the factory carrying a building unit 100. The elements of this transport system 150 embodiment discussed below are the mast tower 185, wedge support structure 188, top and bottom thrust structures 184, building corner lift brackets 189, elevation actuator 151, hoist cables 186, spreader bar 187, and ride height adjustment spacers (not shown).

The mast tower 185 is a strong and rigid structure that is connected to the top and bottom of the building unit 100 in the middle of the end walls 101, 102. These connections to the building 100 can be considered thrust connections because they transfer horizontal (both lateral and front-back) forces to the building structure 100. This mast 185 and the thrust structures 184 counter the turning moment that is introduced by lifting the building unit 100. Horizontal acceleration forces including braking and side loads are also transferred to the road wheels 161, 162 by the mast 185 and the thrust structures 184.

These horizontal forces and turning moments are transferred from the mast tower 185 to the suspension and road wheels 161, 162 by a wedge support structure 188. At the edge nearest the mast tower 185, this wedge 188 forms a sleeve 195 that encircles the mast tower 185. The mast 185 is free to move vertically within the wedge sleeve 195 thru a distance of approximately 4 feet (122 cm). The other end of the wedge 188 is attached to the suspension and wheels 161, 162. The bottom of the front wedge structure 188 has a suspension plate 164 with a king pin that is secured to a truck's 160 fifth wheel during transport. In the rear, the wedge structure 188 is attached to the rear suspension 162. This rear suspension 162 interface is simply that the bottom of the rear wedge structure 188 is welded or otherwise affixed to the tops of the rear suspension 162 beams or support rails.

A building corner lift bracket 189 is attached at each corner of the building unit 100. These 189 are similar to the previously discussed embodiment's lifting frames 151 in that each has elements that correspond to a lifting frame's arm or channel 153, vertical post 152 and diagonal brace 154. There is no need for this structure 189 to be as large as the previously discussed embodiment's lifting frame 151 may be. This building corner lift bracket 189 consists of a structural member (such as angle iron or channel) that is attached to the sidewall sheathing 110 and the floor perimeter band joist 116 of the building unit 100. This connection may be accomplished using lag bolts or similar fasteners (not shown). An optional ledge (not shown) may extend underneath to provide primary or supplementary support to the sidewall sheathing 110 and perimeter floor band joists 116. The corner brackets 189 have vertical structures such as angle irons that extend up the corners of the building 100 where the end walls 101, 102 and the side walls 103, 104 meet. The brackets' 189 horizontal and vertical structures are connected by at least one diagonal structure that provides the horizontal structure with resistance to deflecting under load.

The building corner lift brackets 189 essentially form a hoist system where the two diagonal legs are wire cables or rods 186 and the horizontal structure is an adjustable-length spreader bar 187. The vertical load is transferred from the corner brackets 189 to the wedge structure 188 through this hoist system 186, 187 that delivers the load from the top of the corner lift bracket's 189 vertical members to a "lifting cross beam" 196 that rests atop the wedge structure 188 or alternatively the top mast structure sleeve 195. The use of wire cables or rods 186 to transmit the lifting force to the wedge structure 188 has the added benefit that this configuration has a limited ability to transmit any forces other than vertical lift. This aspect of the design helps to separate the load paths of the vertical forces from that of the horizontal forces. The spreader bar 187 may be adjusted to fit a variety of building 100 widths, and it can be collapsed to fit within the eight foot legal road width envelope.

In one embodiment of the transport system, the elevation system 170 consists of a lifting actuator 171, power supply with connections and controls (not shown), a lifting actuator support structure 197 at the top of the wedge structure 188, elevation cross beam 196, and removable ride height adjustment spacers. The bottom of the lifting actuator 171 is mounted on a lift actuator support structure 197 that delivers the lifting forces to the top of the wedge support structure 188 at the sides. The top of the lifting actuator 171 is attached to the elevation cross beam 196. This elevation cross beam 196 is slightly wider than the mast tower 185, and it forms the topmost element of the hoist system. The hoist's wire cables or rods 186 are attached to the ends of the elevation cross beam 196. The hoist system 186, 187, 197, the lifting actuator 171, its support structure 197, the removable ride height adjustment spacers, and the portion of the wedge support structure 188 that bears the building's weight are all located in a plane between the mast tower 185 and the end wall 101, 102 of the building.

Starting from the configuration where the transport system 150 is initially attached to the building 100, the hydraulic cylinder 171 is used to lift the building structure 100 off the ground up to the desired road carry height. Because it is undesirable to carry the building weight on the hydraulic cylinders 171 the entire time the building 100 is in transport, removable ride height adjustment spacers are inserted and secured between the bottom of the elevation cross beam 196 and the top of the wedge structure 188. These spacers are inserted when the building 100 is first lifted by elevating the building 100 to a sufficient distance above the ground, inserting and securing the spacers, then lowering the building 100 so that it rests on the spacers, not the hydraulic cylinders 171. This configuration allows the hydraulic cylinders 171 to be used as needed during transport to elevate the building 100 to enable it to clear road obstacles such as railroad tracks.

The load path for the weight of the building unit 100 carried in the high speed configuration is as follows: the weight of the building unit 100 is first supported by the building corner lift brackets 189, then the weight is routed through upper tension members (cables or rods) of the hoist 186-spreader bar 187 system, to the lifting cross beam 196, down thru the ride height adjustment spacers, through the wedge support structure 188 where it finally gets delivered to the road wheels (via the fifth wheel to the truck suspension 161 in front and via the dolly suspension 162 in back). The vertical load path when the building unit 100 is elevated above the road carriage height differs from that described above only by the substitution of the hydraulic lift cylinders 171 and their support structures 197 in the place of the ride height adjustment spacers.

FIG. 13 shows another optional embodiment of the transportation systems 150. This embodiment is fundamentally similar to the one shown previously in FIG. 12 although it differs from it in several specific areas. The hoist system 186, 187, 197 shown in FIG. 12 that is used to provide vertical lift capability is replaced in the embodiment shown in FIG. 13 by one or a set of telescoping lifting box beams 198 that are welded or otherwise affixed to attachment arms 153 (and, alternatively, vertical posts 152). These attachment arms 153 are similar to those discussed above in the preferred embodiment and which are shown in FIG. 5A among others. The attachment arms 153 may be configured alone or alternatively may be part of a lifting frame 151 that includes a vertical post 152 and a diagonal brace 154. The telescoping box beams 198 are larger versions of the stabilizing box beams 180, 181 that are used on the preferred embodiment. The mast 185 is similar to a heavy duty, high capacity fork lift tower where the lifted part is welded or otherwise affixed to the telescoping box beams 198. The fixed part of the fork lift tower 185 delivers the weight of the building unit 100 to the suspensions 161, 162 via a gooseneck structure 199. The forklift tower mast 185 is also connected to the building 100 at the top and bottom to transfer the thrust loads and to counter the turning moment introduced by offset lifting.

We claim:

1. A transportable building unit comprising:
two walls defining a central space therebetween, said walls being oriented along a longest length of the building unit, each of said walls comprising a plurality of panels arranged in a first layer and a second layer, in which a majority of joints between panels in the first layer are overlapped by at least one panel of the second layer, wherein overlapping panels are permanently secured to one another by an adhesive bond, the bond having a measurement of stiffness that is greater than a measurement of stiffness of each overlapping panel joined by the adhesive bond;
wherein each of said walls further comprises a plurality of studs, each of the plurality of studs comprises an exterior surface and a plurality of dados formed in the exterior surface;
wherein each panel in the second layer fits snug within at least one of the plurality of dados of the plurality of studs such that each of the plurality of panels in the second layer overlaps at least one of the majority of joints at an interior surface of the plurality of panels in the first layer.

2. The transportable building unit as in claim 1, in which at least one second layer panel is affixed to at least two first layer panels by mechanical fasteners in addition to the adhesive.

3. The transportable building unit as claim 1, further comprising a first band joist rail affixed to one of the walls, a second band joist rail affixed to the other wall, and a floor connecting the first band joist rail to the second band joist rail.

4. The transportable building unit as in claim 3, wherein the floor comprises a plurality of floor panels arranged in a first floor layer and a second floor layer, in which a majority of joints of either lateral or longitudinal orientation between the floor panels of the first floor layer are overlapped by at least one floor panel of the second floor layer, wherein overlapping floor panels are permanently secured to one another by an adhesive bond, the bond having a measurement of stiffness that is greater than a measurement of stiffness of each overlapping floor panel.

5. The transportable building unit as in claim 4, in which a plurality of floor panels are affixed to at least one of the first or second band joist rails by adhesive, and a plurality of floor panels are affixed to the other of the first or second band joist rails by adhesive.

6. The transportable building unit as in claim 1, further comprising a first roof rail affixed to a first of the two walls.

7. The transportable building unit as in claim 6, further comprising a second roof rail affixed to a second of the two walls and a roof connecting the second roof rail to the first roof rail.

8. The transportable building unit as in claim 7, wherein the roof comprises a plurality of roof panels arranged in a first roof layer and a second roof layer, in which a majority of joints between the roof panels of the first roof layer are overlapped by at least one roof panel of the second roof layer, wherein overlapping roof panels are permanently secured to one another by an adhesive bond, the bond having a measurement of stiffness that is greater than a measurement of stiffness of each overlapping roof panel.

9. The transportable building unit as in claim 8, in which multiple roof panels are affixed to at least one of the first or second roof rails by adhesive, and a plurality of roof panels are affixed to the other of the first or second roof rails by adhesive.

10. The transportable building unit as in claim 9, further comprising a floor, wherein the floor comprises a plurality of floor panels arranged in a first floor layer and a second floor layer, in which a majority of joints between the floor panels of the first floor layer are overlapped by at least one floor panel of the second floor layer, wherein overlapping floor panels are permanently secured to one another by an adhesive bond, the bond having a measurement of stiffness that is greater than a measurement of stiffness of each overlapping floor panel.

11. The transportable building unit as in claim 10, further comprising a first band joist rail affixed to one of the walls and a second band joist rail affixed to the other wall, the floor connecting the first band joist rail to the second band joist rail, wherein a plurality of floor panels are affixed to at least one of the first or second band joist rails by adhesive, and a plurality of floor panels are affixed to the other of the first or second band joist rails by adhesive.

12. The transportable building unit as in claim 10, in which the roof is affixed to the walls via near zero-slip joints, and the walls are affixed to the floor via near zero-slip joints.

13. The transportable building unit as in claim 12, being connected to external supports only at opposing ends of such longest length, in which the longest length is at least thirty feet, and the transportable building unit exhibits a midspan deflection of less than one-thirtieth of the longest length.

14. A transportable building unit as in claim 13, further comprising lower structural members below the panels of the floor, wherein a majority of the lower structural members are constructed primarily of materials selected from the group consisting essentially of wood, composites, and polymer materials.

15. A transportable building unit as in claim 14, further comprising upper structural members above the panels of the floor, wherein a majority of the upper structural members are constructed primarily of materials selected from the group consisting essentially of wood, composites, and polymer materials.

16. A transportable building unit as in claim 13, in which a load path about the building unit, while supported from in front of and from behind the building unit, passes through a chain of near zero-slip joints.

17. A transportable building unit as in claim 13, further comprising a load path, which load path is substantially within the walls.

18. A transportable building unit as in claim 1, in which a majority of said panels are wood.

19. A transportable building unit as in claim 1, in which a majority of said panels are materials selected from the group consisting essentially of wood, composites, and polymer materials.

* * * * *